(12) United States Patent
Moody

(10) Patent No.: US 9,051,702 B2
(45) Date of Patent: Jun. 9, 2015

(54) FLOW CONTROL SYSTEM FOR A DETENTION POND

(71) Applicant: THIRSTY DUCK, LP, New Port Richey, FL (US)

(72) Inventor: Jonathan D. Moody, Hudson, FL (US)

(73) Assignee: THIRSTY DUCK, LP, Trinity, FL (US)

( * ) Notice: Subject to any disclaimer, the term of this patent is extended or adjusted under 35 U.S.C. 154(b) by 0 days.

(21) Appl. No.: 14/057,179

(22) Filed: Oct. 18, 2013

(65) Prior Publication Data

US 2014/0044486 A1 Feb. 13, 2014

Related U.S. Application Data

(63) Continuation-in-part of application No. 13/076,502, filed on Mar. 31, 2011, now Pat. No. 8,591,148, which is a continuation-in-part of application No. 12/816,397, filed on Jun. 16, 2010, now Pat. No. 8,585,321, which is a continuation-in-part of application No. 12/463,614, filed on May 11, 2009, now Pat. No. 7,762,741.

(51) Int. Cl.
*E03F 5/10* (2006.01)
*E02B 8/04* (2006.01)
*G05D 7/01* (2006.01)

(52) U.S. Cl.
CPC ............... *E02B 8/045* (2013.01); *E03F 5/107* (2013.01); *G05D 7/0166* (2013.01)

(58) Field of Classification Search
CPC .................................................... E03F 5/107
USPC ............................ 405/41, 80, 96, 97; 137/578
See application file for complete search history.

(56) References Cited

U.S. PATENT DOCUMENTS

| | | |
|---|---|---|
| 706,526 A | 8/1902 | Carlisle |
| 930,903 A | 8/1909 | Tucker |
| 1,758,941 A | 5/1930 | Gibson |
| 2,882,928 A | 4/1959 | Cogliati |
| 3,311,129 A | 3/1967 | Binder |
| 3,832,854 A | 9/1974 | Metts |
| 4,015,629 A | 4/1977 | Morgan et al. |
| 4,094,338 A | 6/1978 | Bauer |
| 4,224,156 A | 9/1980 | Pardikes et al. |
| 4,718,449 A | 1/1988 | Ralph |
| 4,802,592 A | 2/1989 | Wessels |
| 5,133,854 A | 7/1992 | Horvath |
| 5,498,348 A | 3/1996 | Plink |
| 5,820,751 A | 10/1998 | Faircloth, Jr. |
| 6,224,753 B1 | 5/2001 | Marbach |
| 6,238,577 B1 | 5/2001 | MacLaren |
| 6,997,644 B2 | 2/2006 | Fleeger |

(Continued)

*Primary Examiner* — Frederick L Lagman
(74) *Attorney, Agent, or Firm* — Larson & Larson, P.A.; Frank Liebenow; Patrick Ried

(57) ABSTRACT

A flow control system of the present invention includes a movable riser slideably engaged with a stationary riser and having a flange. The stationary riser is interfaced to a downstream drainage system. The movable riser is made buoyant by one or more floats such that, as the water level around the flow control system changes, the movable riser follows the changes based upon the buoyancy of the float(s), thereby maintaining the flange at a constant depth. The gap between an upper edge of the flange and the inner perimeter of the stationary riser coupled with an area of the gap defines a flow rate that is constant. Vents couple an inner cavity of the movable riser to air above the fluid, the inner cavity being in communication with the drainage system as well.

17 Claims, 18 Drawing Sheets

(56) References Cited

U.S. PATENT DOCUMENTS

| | | |
|---|---|---|
| 7,125,200 B1 | 10/2006 | Fulton |
| 7,186,058 B2 | 3/2007 | Schluter |
| 7,429,147 B2 | 9/2008 | Marchetti |
| 7,762,741 B1 * | 7/2010 | Moody .......... 405/96 |
| 7,985,035 B2 | 7/2011 | Moody |
| 8,043,026 B2 | 10/2011 | Moody |
| 8,585,321 B2 * | 11/2013 | Moody .......... 405/96 |
| 8,591,148 B2 * | 11/2013 | Moody .......... 405/96 |

* cited by examiner

FLOW CONTROL SYSTEM FOR A DETENTION POND

CROSS-REFERENCE TO RELATED APPLICATION

This application is a Continuation-in-part of U.S. patent application Ser. No. 13/076,502, now U.S. Pat. No. 8,591,148 issued Nov. 26, 2013, which is in turn a Continuation-in-part of U.S. patent application Ser. No. 12/816,397, now U.S. Pat. No. 8,585,321, issued Nov. 19, 2013, which is in turn a Continuation-in-part of U.S. patent application Ser. No. 12/463,614, now U.S. Pat. No. 7,762,741, issued Jul. 27, 2010. This application is related to U.S. Pat. No. 7,985,035 issued Jul. 26, 2011 and to U.S. Pat. No. 8,043,026 issued Oct. 25, 2011.

FIELD OF THE INVENTION

The disclosure relates to the field of flow control devices and more particularly to a flow control device for a detention pond or surge tank.

BACKGROUND

Detention ponds and surge tanks are deployed to temporarily store a fluid and limit the rate of fluid discharge to a downstream system when the inflow rate of the fluid is variable at times exceeds the functional capacity of the downstream system. In the case of a storm water detention pond, the pond receives increased rates of storm water runoff generated by the development of upstream lands, temporarily stores the runoff and limits the rate of discharge of the runoff to a receiving system of water conveyance such as a river, stream or storm sewer such that the capacity of the receiving system is not exceeded thereby causing flooding, harmful erosion or other environmental damage. Similarly, a surge tank temporarily stores a process fluid of varying inflow rate and limits the rate of discharge of the fluid to that which will not exceed the capacity of a downstream process. In the field of wastewater treatment, a surge tank may be deployed to receive wastewater flows during peak periods of water use, temporarily store the wastewater and limit the release of the wastewater flow to the treatment plant to a rate not exceeding the design capacity of the plant.

The temporary storage volume required for a detention pond or surge tank is dependent on the rate and duration of fluid inflow and the allowable rate and duration of fluid outflow. The larger the difference between the peak rate of inflow and the allowable rate outflow, the greater the volume is required for temporary storage. Whereas providing large storage volumes can be costly such as the expense incurred for land acquisition and excavation required to construct a large detention pond or the expense of fabrication and installation of a very large tank it is therefore advantageous to minimize the amount of temporary storage volume required for safe operation of the system. Minimization of the temporary storage volume required can be accomplished by minimizing the difference between the duration and rate of inflow and the duration and rate of outflow. Since the rate inflow is variable and cannot be controlled, minimization of the required temporary storage volume is achieved when the maximum allowable rate of discharge is sustained for the longest possible duration of time.

The prior art is generally concerned with limiting the maximum outflow rates, at which damage can occur, by employing discharge control mechanisms such as fixed weirs, orifices, nozzles and riser structures whereby the maximum discharge rates of such mechanisms are determined by the geometric configuration of the mechanisms and the height of the fluid or static head acting on the mechanisms. In each case, the maximum flow rate is achieved only at the single point in time at which the static head acting on the mechanism is at its maximum level. Therefore, all discharges occurring when fluid levels are not at their maximums are less than optimal.

One solution to this problem is described in U.S. Pat. No. 7,125,200 to Fulton, which is hereby incorporated by reference. This patent describes a flow control device that consists of a buoyant flow control module housing an orifice within an interior chamber that is maintained at a predetermined depth below the water surface. This flow control device neglects the use of other traditional flow control mechanisms such as weirs, risers and nozzles, has limited adjustability, and utilizes flexible moving parts subject to collapse by excess hydrostatic pressure or failure resulting from material fatigue caused by repeated cyclical motion. Additionally, there is no provision for multiple flow rates, depending upon the rain event.

Many community planners desire the discharge flow rate to be stepped, depending upon the precipitation event. For example, one particular community desires a flow rate of 3 cubic feet per second after a 2-year rain event, 5 cubic feet per second after a 10-year rain event, and 20 cubic feet per second after a 20-year rain event.

What is needed is a flow control device that provides a constant discharge control rates depending upon fluid levels in the detention pond or holding area.

SUMMARY OF THE INVENTION

A flow control system of the present invention includes a movable riser slideably engaged with a stationary riser and having a flange. The stationary riser is interfaced to a downstream drainage system. The movable riser is made buoyant by one or more floats such that, as the water level around the flow control system changes, the movable riser follows the changes based upon the buoyancy of the float(s), thereby maintaining the flange at a constant depth. The gap between an upper edge of the flange and the inner perimeter of the stationary riser coupled with an area of the gap defines a flow rate that is constant.

In another embodiment, a flow control system for integration into a detention pond or surge tank is disclosed including a stationary riser that has a stationary riser hollow core, an axis of which is substantially vertical. An upper end of the stationary riser has an upper edge and a lower end of the stationary riser hollow core is fluidly connected to a drainage system. A movable riser is suspended within the stationary riser and movable vertically within and above the stationary riser along the axis. The movable riser has a flange. An edge of the flange that is most distal from the drainage system defines a gap between the outer edge of the flange and the stationary riser hollow core. The movable riser has a cavity that is open and in fluid communication with the stationary riser hollow core. A channel provides fluid communication between an area above a fluid level of the detention pond and the cavity within the movable channel, thereby permitting air to enter the cavity of the movable channel. At least one float is interfaced to the movable riser, providing buoyancy to the movable riser to raise the movable riser responsive to increases in the fluid level in the detention pond and to lower the movable riser responsive to decreases in the fluid level in the detention pond.

In another embodiment, a flow control system for integration into a detention pond or surge tank is disclosed including a stationary riser that has a stationary riser hollow core. An axis of the stationary riser hollow core is substantially vertical. An upper end of the stationary riser has an upper edge and a lower end of the stationary riser hollow core is fluidly connected to a drainage system. The flow control system includes a stationary riser that has a stationary riser hollow core, an axis of which is substantially vertical. An upper end of the stationary riser has an upper edge and a lower end of the stationary riser hollow core is fluidly connected to a drainage system. A movable riser is suspended within the stationary riser and movable vertically within and above the stationary riser along the axis. The movable riser has a flange. An edge of the flange that is most distal from the drainage system defines a gap between the outer edge of the flange and the stationary riser hollow core. The movable riser has a cavity that is open and in fluid communication with the stationary riser hollow core. An orifice in an end of the movable riser is in fluid communications with the cavity and the orifice is suspended at an orifice depth below the fluid level. A channel provides fluid communication between an area above a fluid level of the detention pond and the cavity within the movable channel, thereby permitting air to enter the cavity of the movable channel. At least one float is interfaced to the movable riser, providing buoyancy to the movable riser to raise the movable riser responsive to increases in the fluid level in the detention pond and to lower the movable riser responsive to decreases in the fluid level in the detention pond.

In another embodiment, a flow control system for integration into a detention pond or surge tank is disclosed including a stationary riser that has a stationary riser hollow core. An axis of the stationary riser hollow core is substantially vertical. An upper end of the stationary riser has an upper edge and a lower end of the stationary riser hollow core is fluidly connected to a drainage system. A subsystem moves vertically within and above the stationary riser hollow core along the axis and provides a constant flow rate. A device moves the subsystem vertically, synchronizing a position of the subsystem to a level of the fluid.

BRIEF DESCRIPTION OF THE DRAWINGS

The invention can be best understood by those having ordinary skill in the art by reference to the following detailed description when considered in conjunction with the accompanying drawings in which.

DETAILED DESCRIPTION

Figure 1:
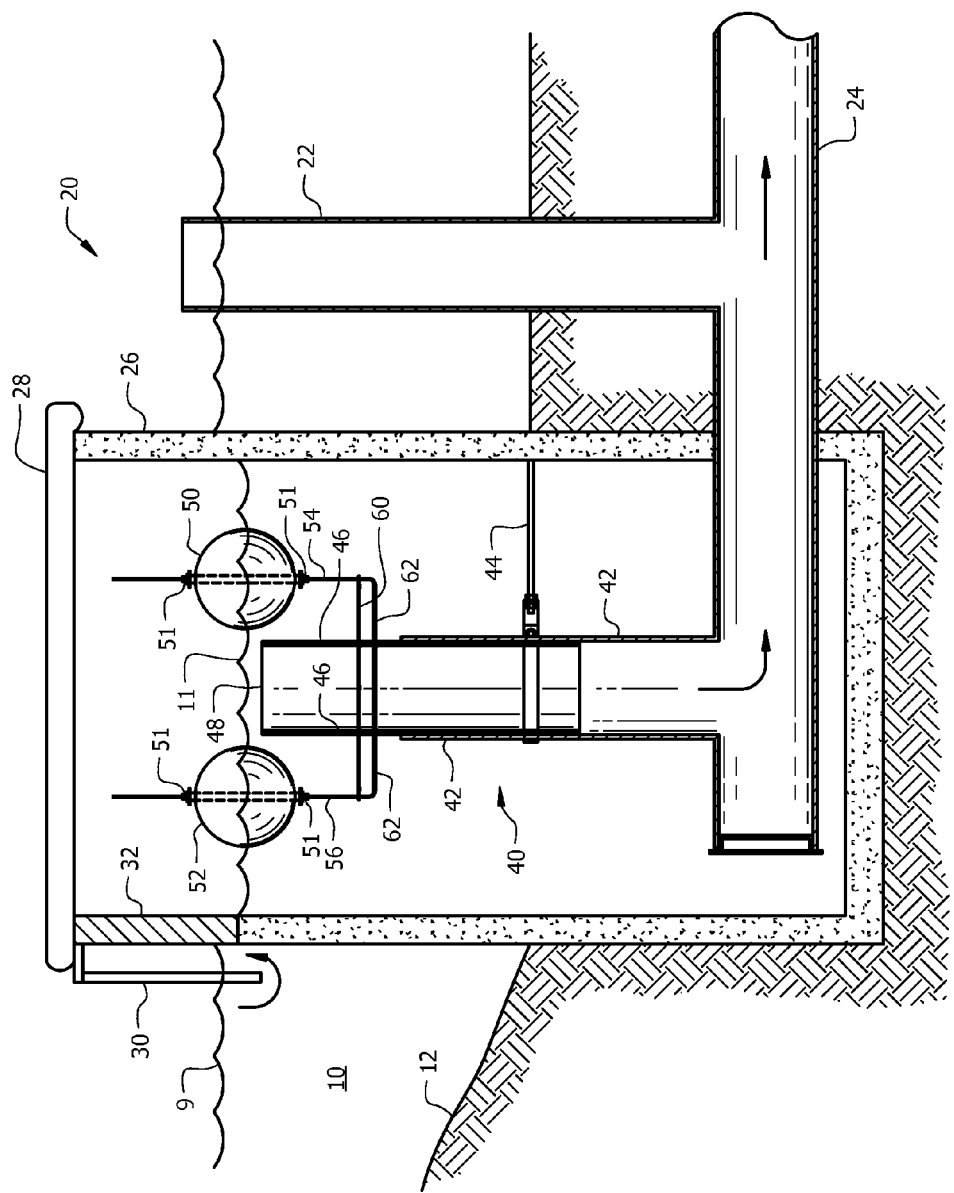
FIG. 1 illustrates a schematic view of a system of the present invention.

Reference will now be made in detail to the presently preferred embodiments of the invention, examples of which are illustrated in the accompanying drawings. Throughout the following detailed description, the same reference numerals refer to the same elements in all figures. Throughout the following description, the term detention pond and surge tank represent any such structure and are equivalent structure for detaining liquids.

The flow control system described provides for an initial discharge rate starting as soon as the detention pond or surge tank reaches a pre-determined liquid level, then, as the liquid level increases, the discharge rate remains relatively constant until a high-water level is reached, at which level the flow control system provides for an increased discharge rate to reduce the possibility of exceeding the volumetric capacity of the detention pond or surge tank.

Prior to more advanced flow control systems, limiting the maximum outflow rates, at which damage can occur, was accomplished by deploying discharge control mechanisms such as fixed weirs, orifices, nozzles and riser structures whereby the maximum discharge rates of such mechanisms are determined by the geometric configuration of the mechanisms and the height of the fluid or static head acting on the mechanisms. In each case, the maximum flow rate is achieved only at the single point in time at which the static head acting on the mechanism is at its maximum level. Therefore, all discharges occurring when fluid levels are not at their maximums are less than optimal and require provision of greater temporary storage capacities. The present invention solves these and other problems as is evident in the following description.

Referring to FIG. 1, a schematic view of a system of the present invention will be described. The detention pond or surge tank flow control system 20 has two primary components, a holding box 26/28/30 and the actual flow control device 40.

The holding box 26/28/30 consists of a holding box 26, typically made of concrete and having a lid 28, typically made of concrete or metal. A debris shield 30 partially covers an opening 32 in the side of the box 26. The holding box 26/28/30 is positioned part way into the bed 12 of the detention pond or bottom of the surge tank 10. As the liquid level 9 in the detention pond or surge tank 10 rises, it is skimmed by the debris shield 30, holding back some or all of any floating debris, oil, etc, and allowing liquid from the detention pond or surge tank to spill over into the holding box 26.

The flow control device 40 consists of a stationary riser 42 and a movable riser 46. The movable riser 46 is supported by floats 50/52 such that, as liquid begins to rise within the holding box 26, the floats become buoyant and lift the movable riser 46, maintaining a constant water depth over the top rim 48 of the movable riser 46. Once the liquid level 11 within the holding box 26 rises above the top rim 48, liquid flows over the top rim 48 at a constant rate independent of the liquid level of the detention pond or surge tank 10 because the top rim 48 is held at approximately the same depth beneath the liquid surface 11 within the holding box 26. The liquid flows through the stationary riser 42 and out the drain pipe 24 to the drainage system, streams, rivers, etc., in the case of a storm water detention pond or downstream process in the case of a surge tank.

The movable riser 46 and the stationary riser 42 have hollow cores and the hollow cores run vertically to accept liquid from the detention pond or surge tank 10 and transfer the liquid from the holding pond 10 to a down-stream drainage system 24. The movable riser 46 hollow core accepts liquid flowing over the rim 48 from the detention pond or surge tank and passes it into the stationary riser 42 hollow core. The stationary riser 42 hollow core passes the liquid to the drain pipe 24 and out to the drainage system, streams, rivers, etc. in the case of a storm water detention pond or downstream process in the case of a surge tank.

In some embodiments, the floats 50/52 are mounted on float shafts 54/56. In such embodiments, optionally, the float shafts 54/56 extend upward beyond the floats 50/52 to provide a maximum lift height for the movable riser 46. In this, as the liquid level 11 rises within the holding box 26 to a high point, the tops of the float shafts 54/56 hit the cover 28, thereby preventing further lifting of the movable riser 46. This accomplishes at least two functions: it prevents the movable riser 46 from disengaging with the stationary riser 42 and it allows a greater flow rate during emergency situations—when the detention pond or surge tank 10 over-fills. In addition, also anticipated is a bypass drain 22, which begins bypassing water when the liquid in the detention pond or surge tank 10 reaches a certain height.

Although there are many ways to interface the floats 52/54 with the movable riser 48, shown is a pair of float shafts 54/56. In one embodiment, the float shafts 54/56 are threaded shafts with nuts 51 holding the floats 50/52 at an adjustable height on the float shafts 54/56. In this way, with a simple tool, the operating depth (depth of the top rim 48 with respect to the liquid level 11 within the holding box 26) is easily adjusted. As shown, the float shafts 54/56 are interfaced with the movable riser 46 by two float cross members 60/62, although any number of cross members 60/62 are anticipated, including one. It is also anticipated that the floats 50/52 are also adjusted by bending of the float shafts 54/56 and or the float cross members 60/62.

Although the flow control system 40 is capable of supporting itself within the holding box 26, it is anticipated that one or more optional struts 44 are provided to secure the flow control system 20 to the holding box 26.

In some embodiments, a lock (not shown) is provided to lock the cover 28 on top of the holding box 26.

Figure 2:
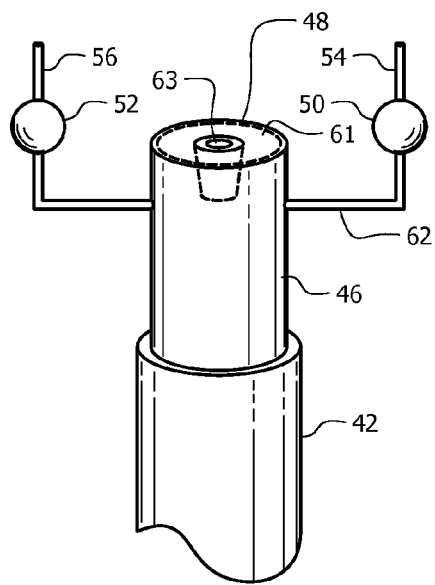
FIG. 2 illustrates a perspective view of the movable riser of a first embodiment of the present invention.

Referring to FIG. 2, a perspective view of the movable riser 46 of a first embodiment of the present invention will be described. For simplicity, the floats 50/52 are shown affixed to float shafts 54/56 and a single cross member 62, the cross member 62 holding the float shafts 54/56 to the movable riser 46. In such embodiments, the floats 50/52 are adjustable by bending of the float shafts 54/56 and/or the cross member 62 or by adjusting the vertical position of the floats 50/52 on the float shafts 54/56. Any number and/or shape of floats 50/52 are anticipated. Although shown throughout this description as spherical, other shapes of floats 50/52 are anticipated including square or rectangular boxes, etc.

There are many shapes and configurations for the top opening of the movable riser 46, one example of which is shown in FIG. 2. In this example, a movable riser top cover 61 has a nozzle 63. The nozzle 63 is smaller than the diameter of the movable riser 46, therefore, restricting the flow of water from the holding box 26 into the movable riser 46 and, hence, out of the drain pipe 24. Although shown as being circular in shape, any shape nozzle 63 is anticipated.

Figure 3:
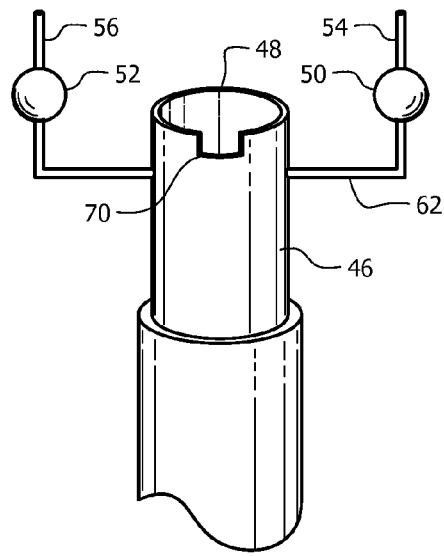
FIG. 3 illustrates a perspective view of the movable riser of a second embodiment of the present invention.

Referring to FIG. 3, a perspective view of the movable riser 46 of a second embodiment of the present invention will be described. For simplicity, the floats 50/52 are again shown affixed to float shafts 54/56 and a single cross member 62, the cross member 62 holding the float shafts 54/56 to the movable riser 46. In such embodiments, the floats 50/52 are adjustable by bending of the float shafts 54/56 and/or the cross member 62 or by adjusting the vertical position of the floats 50/52 on the float shafts 54/56. There are many edge shapes and configurations for the top rim of the movable riser 46, one example of which is shown in FIG. 3. In this example, a rectangular notch 70 is cut or formed on the rim 48 of the movable riser 46. The notch 70 provides a first flow of water from the holding box 26 into the movable riser 46 at a point at which the water level 11 rises above the bottom surface of the notch 70 and a second, greater flow of water from the holding box 26 into the movable riser 46 at a point at which the water level rises above the rim 48 of the movable riser 46. Although a single notch 70, rectangular in shape is shown, any number of notches 70 or any shape opening 70 is anticipated.

Figure 4:
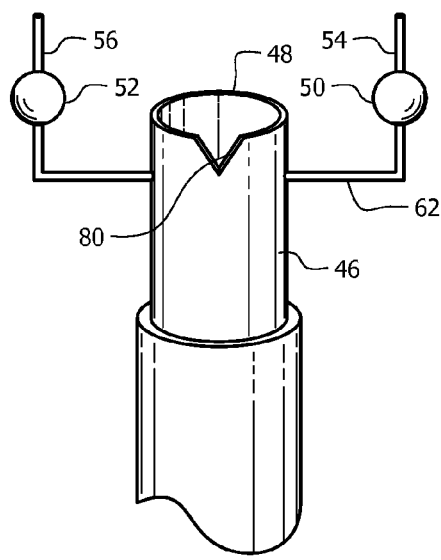
FIG. 4 illustrates a perspective view of the movable riser of a third embodiment of the present invention.
Figure 5:
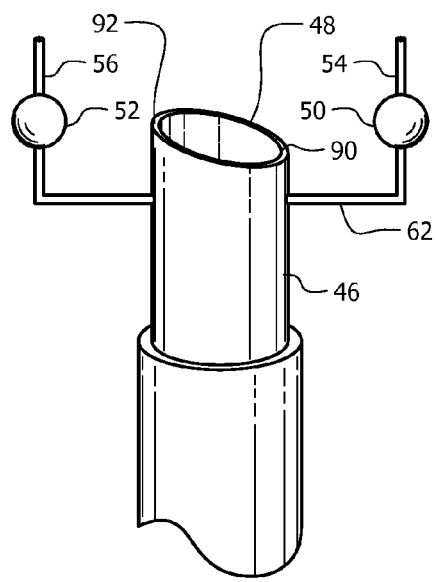
FIG. 5 illustrates a perspective view of the movable riser of a fourth embodiment of the present invention.

Referring to FIG. 4, a perspective view of the movable riser 46 of a third embodiment of the present invention will be described. For simplicity, the floats 50/52 are again shown affixed to float shafts 54/56 and a single cross member 62, the cross member 62 holding the float shafts 54/56 to the movable riser 46. In such embodiments, the floats 50/52 are adjustable by bending of the float shafts 54/56 and/or the cross member 62 or by adjusting the vertical position of the floats 50/52 on the float shafts 54/56. There are many edge shapes and configurations for the top rim of the movable riser 46, one example of which is shown in FIG. 4. In this example, a triangular notch 80 is cut or formed on the rim 48 of the movable riser 46. The notch 80 provides a gradually increased rate of flow of water from the holding box 26 into the movable riser 46 starting at a point at which the water level 11 rises above the bottom corner of the triangular notch 80 and increasing as the water level rises to a point equal to the rim 48 of the movable riser 46 at which point the water flow further increases as the water rises above the rim 48. Although shown as being triangular in shape, other opening shapes 80 are anticipated. Also, any number of notches 80 and/or notch 80 shapes is anticipated Referring to FIG. 5, a perspective view of the movable riser of a fourth embodiment of the present invention will be described. Again, for simplicity, the floats 50/52 are shown affixed to float shafts 54/56 and a single cross member 62, the cross member 62 holding the float shafts 54/56 to the movable riser 46. In such embodiments, the floats 50/52 are adjustable by bending of the float shafts 54/56 and/or the cross member 62 or by adjusting the vertical position of the floats 50/52 on the float shafts 54/56. There are many edge or rim 48 shapes and configurations for the top rim 48 of the movable riser 46, one example of which is shown in FIG. 5. In this example, the rim 48 of the movable riser 46 is sloped 90/92. The slope 90/92 provides a gradual and linear increased rate of water flow starting at a point at which the water level 11 rises above the lower point 90 of the rim 48, increasing until the water level rises to the top point 92 of the rim 48. Although shown as being a linear increase between the lower point 90 and the top point 92, any other slope and or stepping is anticipated. For example, the increase between the lower point 90 and the top point 92 is stepped at equal steps or is asymptotic.

Figure 6:
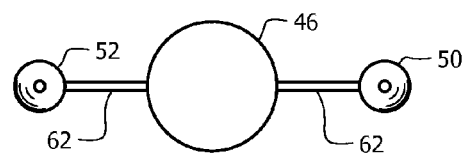
FIG. 6 illustrates a top plan view of a float system of the present invention.

Referring to FIG. 6, a top plan view of a float system of the present invention will be described. In this example, two floats 50/52 are attached to the movable riser 46 by cross members 62. It is anticipated that the cross member 62 is either affixed to the surface of the movable riser 46, passes through the movable riser 46 or is held by a bracket passing all or part way around the movable riser 46, as known in the industry.

Figure 7:
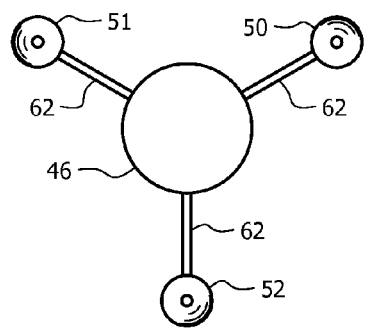
FIG. 7 illustrates a top plan view of an alternate float system of the present invention.

Referring to FIG. 7, a top plan view of an alternate float system of the present invention will be described. In this example, three floats 50/51/52 are attached to the movable riser 46 by cross members 62. It is anticipated that the cross member 62 is either affixed to the surface of the movable riser 46, passes through or part-way the movable riser 46 or is held by a bracket passing all or part way around the movable riser 46, as known in the industry. Although any number of floats 50/51/52 is anticipated, two or three floats 50/51/52 are preferred.

Figure 8:
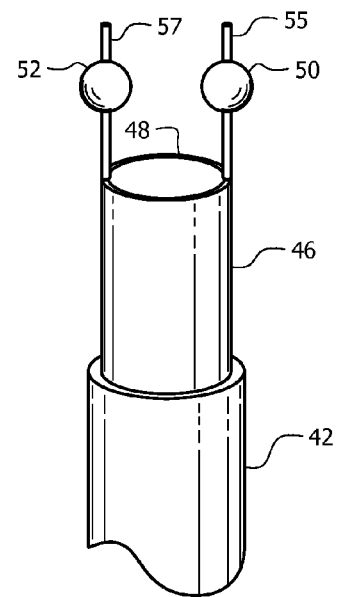
FIG. 8 illustrates a perspective view of another alternate float system of the present invention.

Referring to FIG. 8, a perspective view of another alternate float system of the present invention will be described. In this example, two floats 50/52 are attached to the movable riser 46 by the float shafts 55/57. It is anticipated that the float shafts 55/57 are either affixed to a surface of the movable riser 46 or are tapped/threaded into the movable riser 46, as known in the industry. Again, any number of floats 50/52 of any shape is anticipated.

Figure 9:
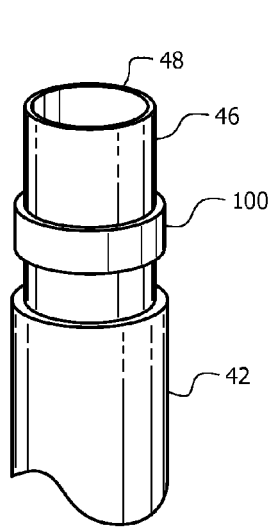
FIG. 9 illustrates a perspective view of another alternate float system of the present invention.

Referring to FIG. 9, a perspective view of another alternate float system of the present invention will be described. In this example, the float 100 surrounds or is directly affixed to the outside of the movable riser 46. Although shown as a single float 100 affixed to the entire circumference of the movable riser 46, it is also anticipated that the float 100 is in sections, each affixed to the outer circumference of the movable riser 46. In this embodiment, the float is, for example, a Styrofoam ring or balloon filled with a gas that has a specific gravity of less than 1. It is anticipated that, in some embodiments, the float 100 is slideably affixed to the movable riser 46, such that, the float 100 is repositionable either closer to or further away from the rim 48, thereby adjusting the average liquid height above the rim 48. It is also anticipated that, in embodiments in which the float 100 is a balloon filled with a gas, the inflation volume is adjustable, also adjusting the average liquid height above the rim 48.

Figure 10:
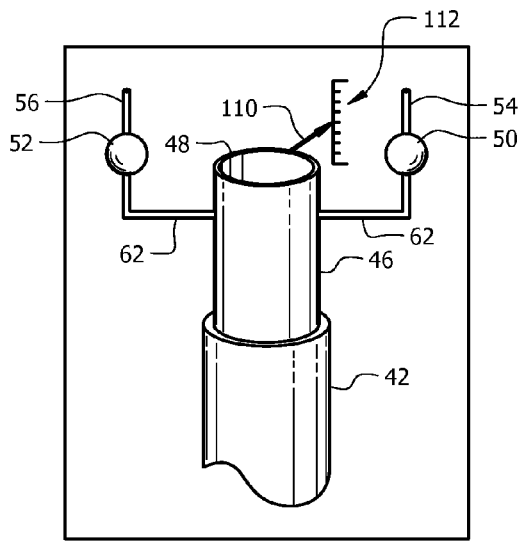
FIG. 10 illustrates a perspective view of an alternate embodiment of the present invention.

Referring to FIG. 10, a perspective view of an alternate embodiment of the present invention will be described. In this example, a pointer or scribe 110 is affixed to the movable riser 46 and set to aim at a gradient 112, providing a means for helping the site engineer to properly adjust the floats 50/51/52/100 based upon the desired discharge rate.

Figure 11:
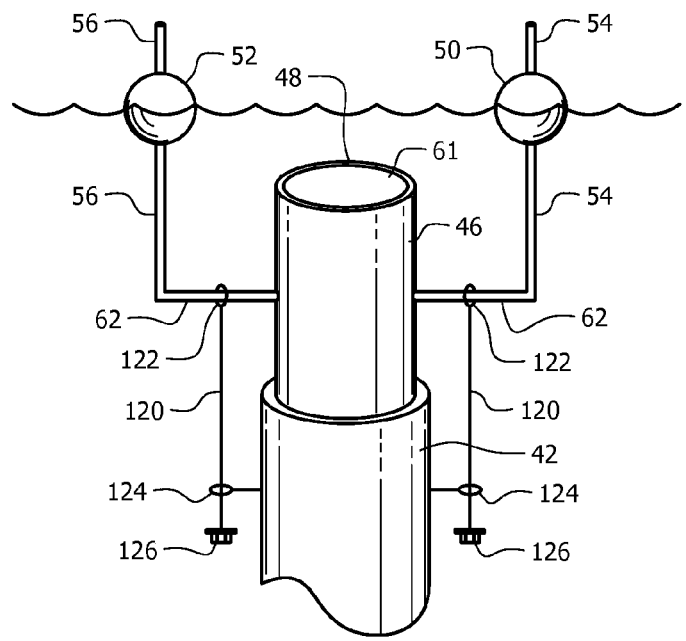
FIG. 11 illustrates a perspective view of another alternate embodiment of the present invention.

Referring to FIG. 11, a perspective view of another alternate embodiment of the present invention will be described. This shows an exemplary way to restrict the rise of the movable riser 46 when there is no surface above the float rods 54/56 to restrict the height of travel of the movable riser 46. In this, one or more arms 120 are affixed to the cross members 62 by, for example, by loop(s) 122. The arm(s) 120 freely pass within an eye 124 or eyes 124 or other similar structures and there is a stop 126 at the bottom end of the arm(s) 120 such that, as the movable riser 46 lifts to a predetermined limit, the stop(s) 126 prevent the movable riser 46 from raising any further than allowed by the stop(s) 126 and the length of the arm(s) 120. It is anticipated that the stop(s) 126 are adjustable along the length of the arm(s) 120, providing an adjustable maximum height of travel for the movable riser 46.

Figure 12:
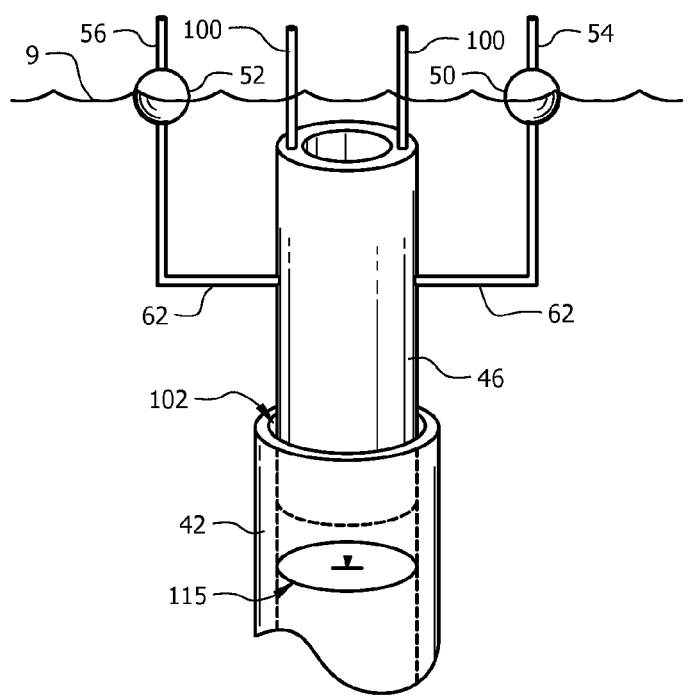
FIG. 12 illustrates a perspective view of an alternate embodiment of the present invention.

Referring to FIG. 12, a perspective view of an alternate embodiment of the present invention will be described. In this embodiment, the top rim 48 of the movable riser 46 is below the surface of the liquid 9, held by floats 50/52 on supports 54/56/62. In this example, there is also a noticeable interstitial opening 102 between the stationary riser 42 and the movable riser 46. The liquid flows over the top rim 48 of the movable riser 46 and eventually out through the drainage system 24 (see FIG. 1). The liquid also flows out through the interstitial opening or gap 102 between the movable riser 46 and the stationary riser 42. Since the movable riser 46 rises in response to the fluid level 9, and the top rim 48 of the movable riser 46 is maintained at a constant depth with respect to the fluid level 9, the flow rate through the movable riser 46 is constant as long as air is allowed to enter the movable riser 46 through one or more air vent tubes 100 when the drainage system 24 (see FIG. 1) is surcharged and not otherwise operating under open channel flow conditions. In some embodiments, instead of independent air vent tubes 100, the supports 54/56/62 are hollow, venting air into the movable riser 46. Since the restriction to flow through the interstitial opening or gap 102 is fixed at the top edge of the stationary riser 42, the flow rate through the interstitial opening 102 is variable with respect to the fluid level 9; where the degree of variability in the flow rate is a function of the cross sectional area of the interstitial opening or gap 102. The liquid level 115 in the drainage system 24 and stationary riser 42 is lower than the bottom of the movable riser 46.

Figure 13:
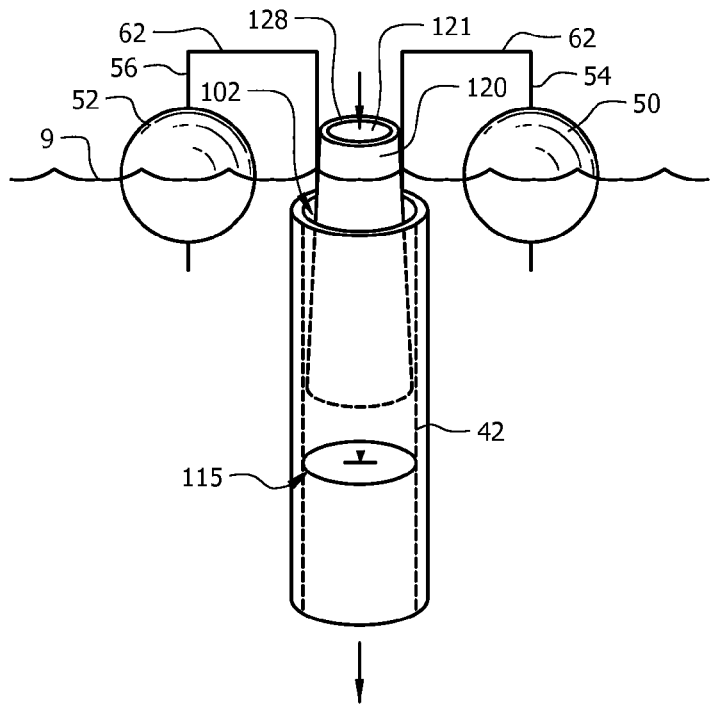
FIG. 13 illustrates a perspective view of an alternate embodiment of the present invention.

Referring to FIG. 13, a perspective view of an alternate embodiment of the present invention will be described. In this embodiment, the drainage system 24 (see FIG. 1) is surcharged (i.e. not operating under open channel flow conditions) and the top rim 128 of the movable riser 120 is held above the surface of the liquid 9 by floats 50/52 on supports 54/56/62. In this example, there is also a noticeable interstitial opening 102 between the stationary riser 42 and the movable riser 120. The liquid flows through the interstitial opening or gap 102 between the stationary riser 42 and the movable riser 120. Since the movable riser 120 rises in response to the fluid level 9, the bottom edge of the movable riser 120 is maintained at a constant depth with respect to the fluid level 9 and, therefore, the flow rate is constant through the interstitial opening 102 since air is allowed to enter the movable riser 120 through a central opening 121 and cavity (not visible) within the movable riser 120 liquid level 115 in the drainage system 24. The diameter of the movable riser 120 gradually decreases towards the top such that the restriction to flow through the interstitial opening or gap 102 is maintained at the bottom edge of the movable riser 120. The liquid level 115 in the drainage system 24 and stationary riser 42 is lower than the bottom of the movable riser 120.

Figure 13A:
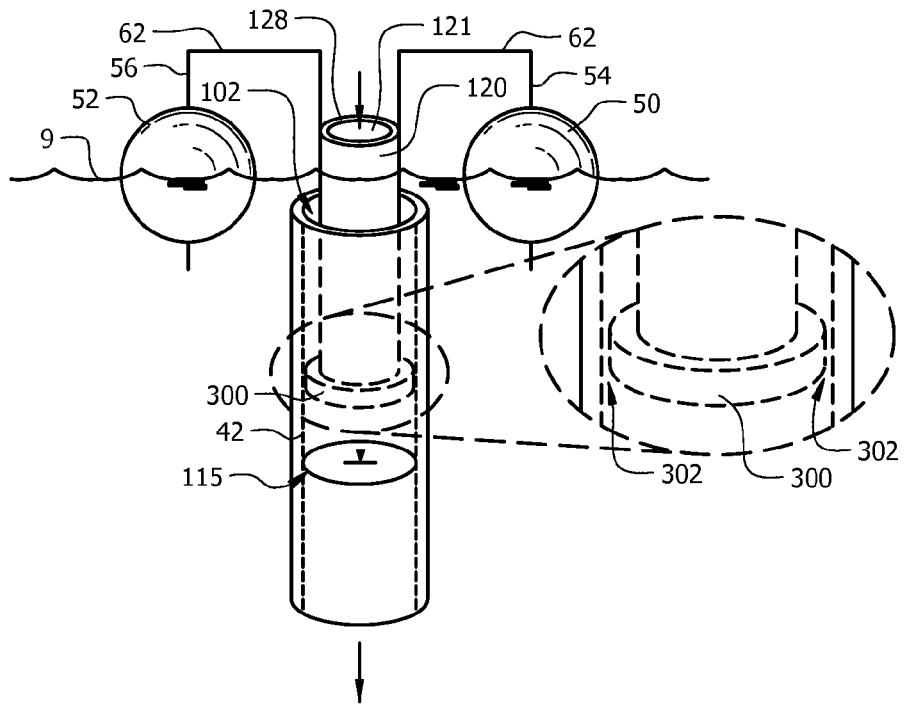
FIG. 13A illustrates a perspective view of an alternate embodiment of the present invention.

Referring to FIG. 13A, a perspective view of an alternate embodiment of the present invention will be described. In this embodiment, the drainage system 24 (see FIG. 1) is surcharged (i.e. not operating under open channel flow conditions) and the top rim 128 of the movable riser 120 is held above the surface of the liquid 9 by floats 50/52 on supports 54/56/62. In this example, there is also a noticeable interstitial opening 102 between the stationary riser 42 and the movable riser 120 having a flange 300 at an end of the movable riser 120 that is below the surface of the liquid 9. The liquid flows through the interstitial opening or gap 102 between the stationary riser 42 and the movable riser 120. Since the movable riser 120 rises in response to the fluid level 9, the flange 300 of the movable riser 120 is maintained at a constant depth with respect to the fluid level 9 and, therefore, the flow rate is constant through the interstitial opening 102 since air is allowed to enter the movable riser 120 through a central opening 121 and cavity (not visible) within the movable riser 120 in fluid communications with the liquid level 115 in the drainage system 24. The outer diameter of the flange 302 is less than the inner diameter of the stationary riser 120, forming a gap 302. In the configuration of FIG. 13A, the flow rate is a function of the height of the water over the top edge of the flange 300 and the area of the gap 302 between the top edge of the flange 300 and the inside wall of the stationary riser 42. The liquid level 115 in the drainage system 24 and stationary riser 42 is lower than the bottom of the movable riser 120.

Figure 14:
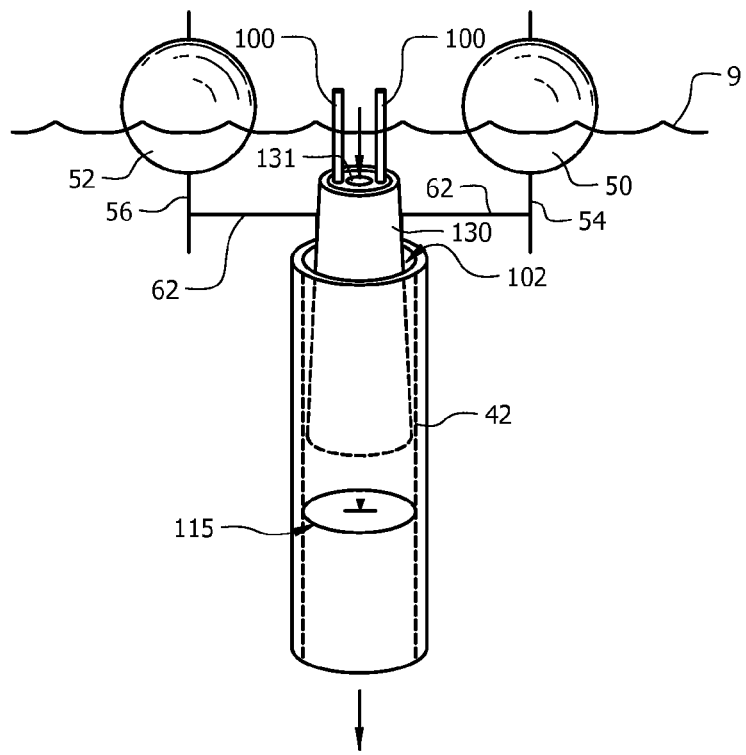
FIG. 14 illustrates a perspective view of an alternate embodiment of the present invention.

Referring to FIG. 14, a perspective view of an alternate embodiment of the present invention will be described. In this embodiment, the drainage system 24 (see FIG. 1) is surcharged (i.e. not operating under open channel flow conditions) and the orifice or opening 131 of the movable riser 130 is held below the surface of the liquid 9, by floats 50/52 on supports 54/56/62. In this example, there is also an interstitial opening 102 between the stationary riser 42 and the movable riser 130. The liquid flows into the orifice or opening 131 of the movable riser 130 through a cavity within the movable riser 130 (not visible) and eventually out through the drainage system 24 (see FIG. 1). The liquid also flows through the interstitial opening or gap 102. Since the movable riser 130 rises in response to the fluid level 9, the orifice 131 is maintained at a constant depth with respect to the fluid level. Likewise, the bottom edge of the movable riser 46 is maintained at a constant depth with respect to the fluid level 9 and, therefore, the flow rate is constant, both through the orifice/opening 131 of the movable riser 130 and through the interstitial opening 102 since air is allowed to enter the movable riser 130 through one or more air vent tubes 100. In some embodiments, instead of independent air vent tubes 100, the supports 54/56/62 are hollow, venting air into the movable riser 46. The diameter of the movable riser 130 gradually decreases towards the top such that the restriction to flow through the interstitial opening or gap 102 is maintained at the bottom edge of the movable riser 130. The liquid level 115 in the drainage system 24 and stationary riser 42 is lower than the bottom of the movable riser 130.

Figure 14A:
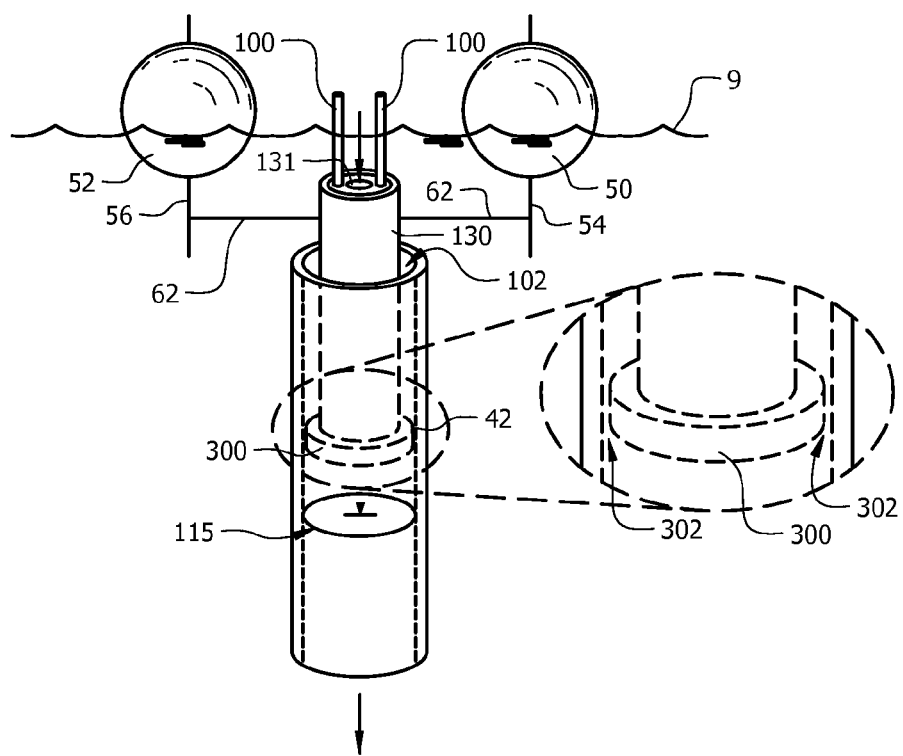
FIG. 14A illustrates a perspective view of an alternate embodiment of the present invention.

Referring to FIG. 14A, a perspective view of an alternate embodiment of the present invention will be described. In this embodiment, the drainage system 24 (see FIG. 1) is surcharged (i.e. not operating under open channel flow conditions) and the orifice or opening 131 of the movable riser 130 is held below the surface of the liquid 9, by floats 50/52 on supports 54/56/62. In this example, there is an interstitial gap 102 between the stationary riser 42 and the movable riser 130. The liquid flows into the orifice or opening 131 of the movable riser 130 through a cavity within the movable riser 130 (not visible) and eventually out through the drainage system 24 (see FIG. 1). The liquid also flows through the interstitial gap 102. Since the movable riser 130 rises in response to the fluid level 9, the flange 300 of the movable riser 130 is maintained at a constant depth with respect to the fluid level 9 and, therefore, the flow rate is constant through the interstitial opening 102 since air is allowed to enter the movable riser 130 through the vents 100 that are in fluid communications with the cavity (not visible) within the movable riser 130. Likewise, the orifice 131 is maintained at a constant depth with respect to the fluid level. The outer diameter of the flange 300 is less than the inner diameter of the stationary riser 42, forming a gap 302. The flow rate is a function of the height of the water over the top edge of the flange 300 and the area of the gap 302 between the top edge of the flange 300 and the inside wall of the stationary riser 130 plus an additional flow rate of the liquid passing through the orifice 131 which is a function of the areas of the orifice 131 and the depth of the orifice 131 below the surface 9. Since the depths of the orifice 131 and the flange 300 with respect to the surface 9 are constant, the flow rate is constant, both through the orifice 131 and through the interstitial opening 102. Air is allowed to enter the movable riser 130 through one or more air vent tubes 100. In some embodiments, instead of independent air vent tubes 100, the supports 54/56/62 are hollow, venting air into the movable riser 130. The liquid level 115 in the drainage system 24 and stationary riser 42 is lower than the bottom of the movable riser 130.

Figure 15:
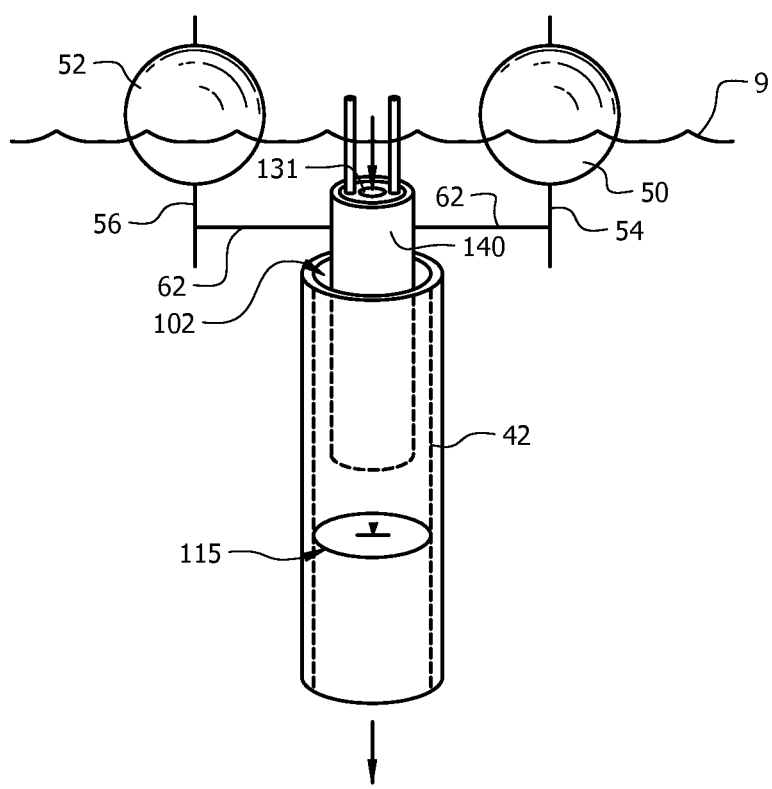
FIG. 15 illustrates a perspective view of an alternate embodiment of the present invention.

Referring to FIG. 15, a perspective view of an alternate embodiment of the present invention will be described. In this embodiment, the drainage system 24 (see FIG. 1) is surcharged (i.e. not operating under open channel flow conditions) and the orifice 141 of the movable riser 140 is held below the surface of the liquid 9, by floats 50/52 on supports 54/56/62. In this example, there is also a noticeable interstitial opening 102 between the stationary riser 42 and the movable riser 140. The liquid flows into the orifice 141 of the movable riser 140 and eventually out the drainage system 24 (see FIG. 1). The liquid also flows out through the interstitial opening or gap 102. Since the movable riser 140 rises in response to the fluid level 9, the flow rate is constant both through the orifice 141 of the movable riser 140 and through the interstitial opening 102 and because air enters into the movable riser 140. Since the diameter of the movable riser 140 is constant along its length and the interstitial opening or gap 102 has a uniform cross sectional area, the restriction to flow through the interstitial opening or gap 102 is fixed at the rim of the stationary riser 42 and the flow rate through the interstitial opening or gap 102 is variable with respect to fluid level 9 where the degree of variability is a function of the cross sectional area of the interstitial opening or gap 102. The liquid level 115 in the drainage system 24 and stationary riser 42 is lower than the bottom of the movable riser 140.

Figure 16:
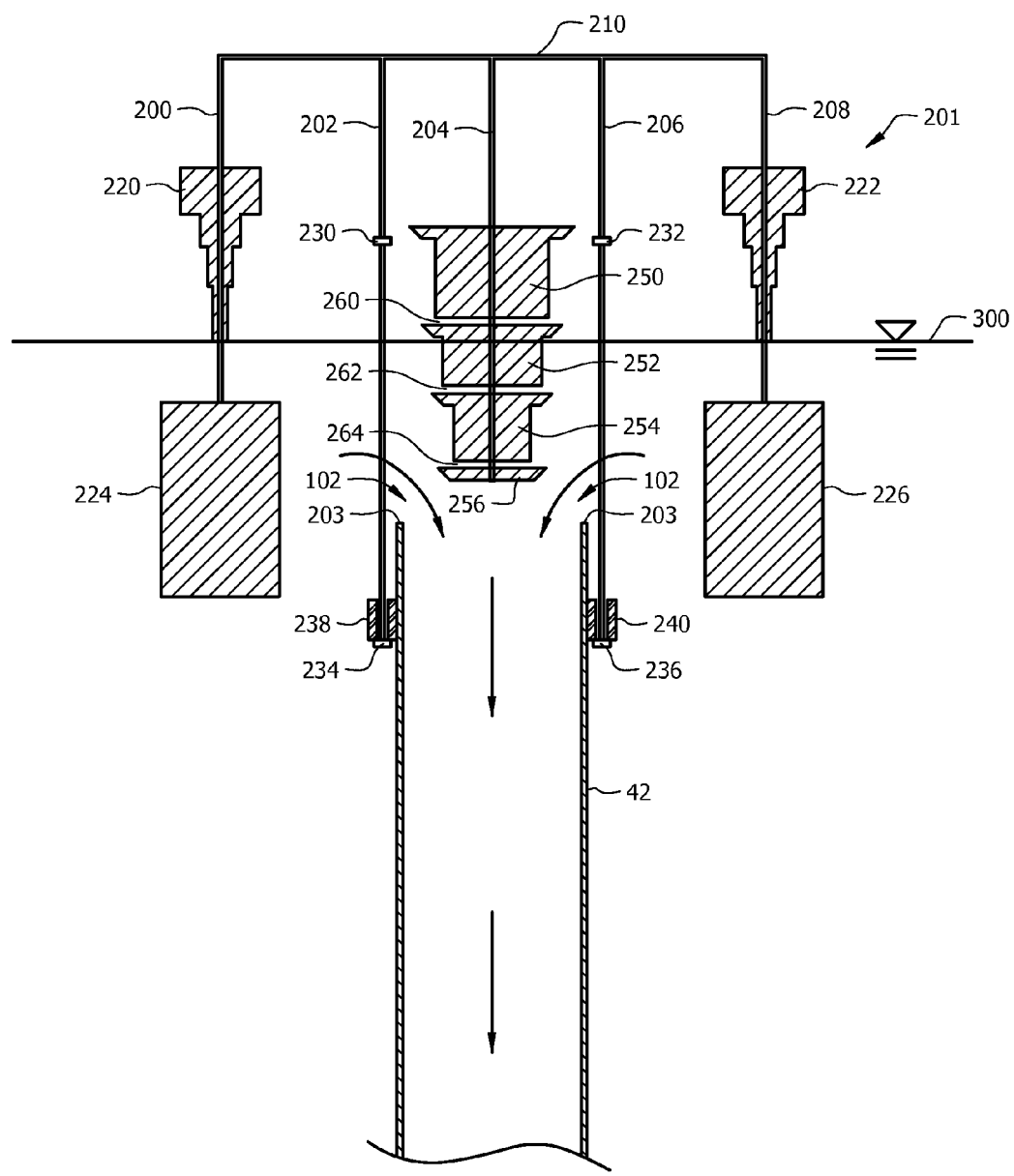
FIG. 16 illustrates a cross-sectional view of an embodiment of the multi-rate flow control system.

Referring to FIG. 16, a perspective view of the multi-rate flow control system 201 will be described. In this view, the drainage system 24 (see FIG. 1) is not shown for clarity reasons. The movable riser 250/252/254/256 comprises multiple flow rate restrictors 250/252/254/256. Although four flow rate restrictors 250/252/254/256 are shown, in other embodiments, any number of flow rate restrictors 250/252/254/256 is anticipated, corresponding to the number of flow rates required. The movable riser 250/252/254/256 moves vertically within the stationary riser 42 and, in this example, vertical travel is limited by one or more limit rods 202/206, low-level stops 230/232 and high-level stops 234/236. The limit rods 202/206 pass through bushings 238/240 that are formed or attached to the stationary riser 42. As the movable riser 250/252/254/256 lifts to its highest travel point, the high-level stops 234/236 hit the bushings 238/240, preventing the movable riser 250/252/254/256 from lifting out of the stationary riser 42. As the movable riser 250/252/254/256 descends to its lowest travel point, the low-level stops 230/232 hit the bushings 238/240, preventing the movable riser 250/252/254/256 from descending too far into the stationary riser 42. In addition to limiting the distance the moveable riser 250/252/254/256 travel, the limit rods 202/206 and bushings 238/240 also prevent the moveable riser from rotating within the stationary riser 42 in any plane. This is an example of one way to limit travel and any other limit is anticipated and included here within.

Floats 220/222/224/226 on supports 200/208/210 are buoyant within the fluid 300 (e.g. water in the detention pond). As the level of the fluid 300 rises, the floats lift the movable riser 250/252/254/256, maintaining a constant flow rate until the uppermost flow rate restrictor 250/252/254/256 with its outer edge remaining below the upper rim 203 of the of stationary riser 42 rises above the upper rim 203 of the stationary riser 42 and flow rate becomes limited by next lower flow rate restrictor section 250/252/254/256 of the moveable riser and subsequent flow rate restrictor sections of the movable riser as the moveable riser 250/252/254/256 continues to rise. In this embodiment, the upper floats 220/222 are stepped and have varying cross-sectional areas, providing greater buoyancy when all sections of the movable riser 250/252/254/256 are below the upper rim fluid level 203 of the stationary riser 42 and lesser buoyancy as each of the successive flow rate restrictor sections of the movable riser 250/252/254/256 rise above the upper rim 203 of the stationary riser 42. Many configurations of floats 220/222/224/226 are anticipated with various geometries to compensate for different sized (mass, area and buoyancy) sections of the movable riser 250/252/254/256, that being shown is one example of such. In a preferred embodiment, though not required, the floats 220/222/224/226 are a continuous ring as viewed from above, so as to provide greater stability as well as to provide skimming action to inhibit floating debris from passing into the stationary riser and out to the drainage system 24. As will be shown, it is preferred to have spaces 260/262/264 between the flow rate restrictor sections of the movable riser 250/252/254/256.

In this embodiment, the flow rate is proportional depth of the fluid over the interstitial opening 102 where the interstitial opening 102 is the area between the inner perimeter of the stationary riser 42 and the outer edge of the flow rate restrictor 250/252/254/256 having the greatest area in the horizontal plane within the stationary riser 42 (preferably the highest flow rate restrictor 250/252/254/256 within the stationary riser 42) that is still below the rim of the stationary riser 42.).

The liquid passes through the interstitial opening 102 and eventually out to the drainage system 24 (see FIG. 1). Since the movable riser 250/252/254/256 rises in response to the fluid level 300, the depth over the interstitial opening 102 remains constant and, therefore, the flow rate remains constant until the flow rate restrictor 250/252/254/256 having the greatest area in the horizontal plane within the stationary riser 42 (e.g. top of uppermost flow rate restrictor 250/252/254/256) rises above the upper rim 203 of the stationary riser 42. In a preferred embodiment, air enters into the stationary riser 42 through the riser tube 204 or through side tubes (see FIG. 25). Throughout the remainder of this discussion, the flow rate restrictor 250/252/254/256 of the movable riser 250/252/254/256 having the greatest area in the horizontal plane within the stationary riser 42 is referred to as the active flow rate restrictor 250/252/254/256. The active flow rate restrictor 250/252/254/256 determines the area of the interstitial space or interstitial opening 102 and, hence, the flow rate until the active flow rate restrictor 250/252/254/256 rises above the upper rim 203 of the stationary tube 42 and next or subsequent flow restrictor 250/252/254/256 becomes the active flow rate restrictor 250/252/254/256.

Figure 17:
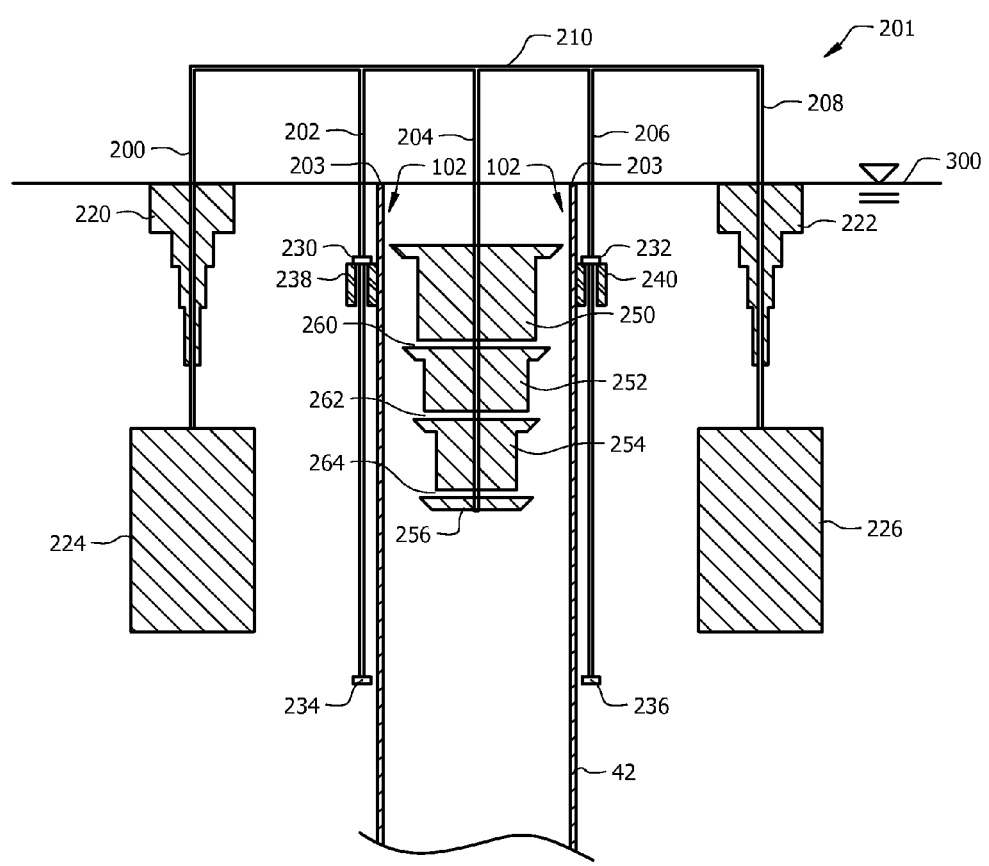
FIG. 17 illustrates a cross-sectional view of an embodiment of the multi-rate flow control system at a first stage of flow.

Referring to FIGS. 17-24 and 24A, cross-sectional views of the multi-rate flow control system 201 will be described showing various fluid levels. In FIG. 17, the fluid level 300 is at or below the upper rim 203 of the stationary riser 42 and the floats 220/222/224/226, flow rate restrictors 250/252/254/256 and supports 200/202/204/206/208 are not buoyant and, therefore, the low-level stops 230/232 rest on the bushings 238/240 and keep the floats 220/222/224/226, flow rate restrictors 250/252/254/256 and supports 200/202/204/206/208 at a desired level. Note that in FIG. 17, it appears that the top surface of the floats 220/222 are even with the fluid level 300. Although it is preferred that the top surface of the floats 220/222 extend above the fluid level 300 to assist in skimming debris from the surface of the fluid 300, there is no requirement that the floats 220/222 extend above the fluid level 300. Since the fluid level is at or below the upper rim 203 of the stationary riser 42, no fluid 300 flows to the drainage system 24 (see FIG. 1).

Figure 18:
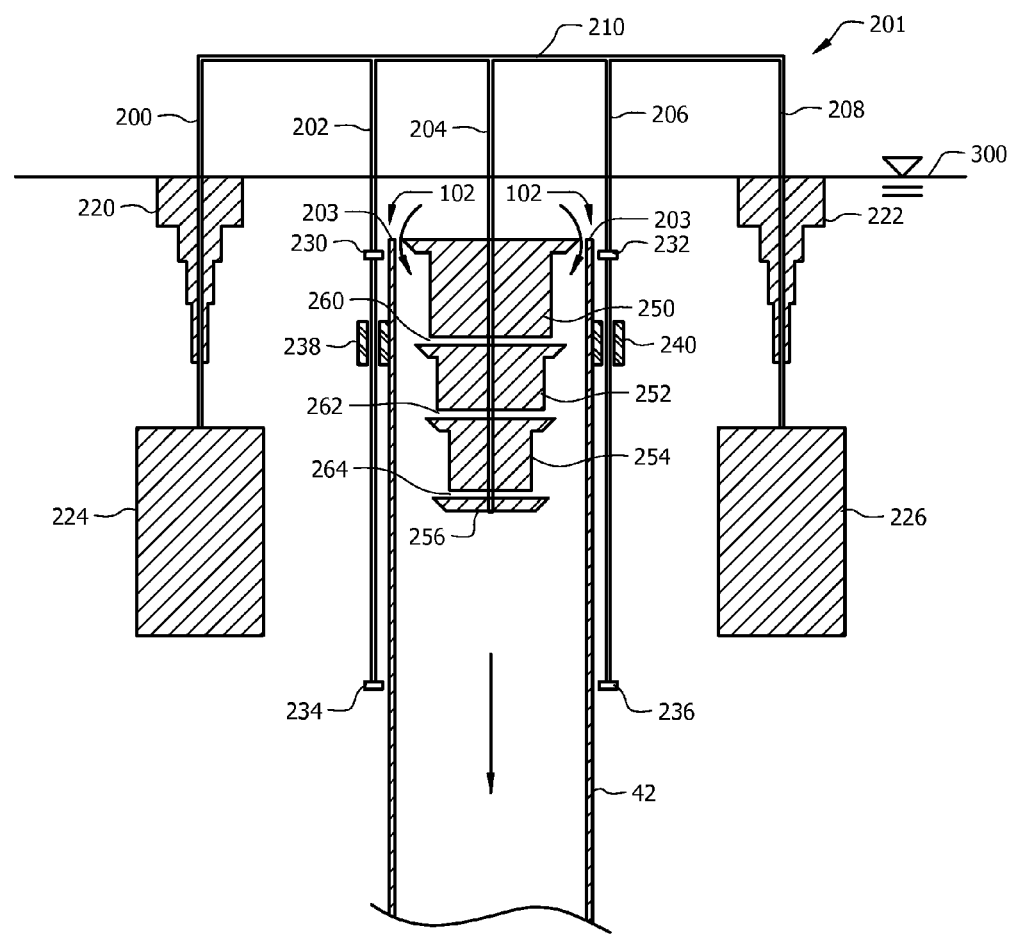
FIG. 18 illustrates a cross-sectional view of a stepped embodiment of the multi-rate flow control system showing operation at a second stage of flow.

Continuing with FIG. 18, the fluid level 300 is now above the upper rim 203 of the stationary riser 42 and the fluid 300 is now flowing through the interstitial opening 102 created by the outer edge of the uppermost flow rate restrictor 250 and the inner perimeter of the stationary riser 42, and out through the drainage system 24 (see FIG. 1). Although it is anticipated that any desired order of flow rate restrictor size is anticipated, in this example, the outer edge of the uppermost flow rate restrictor 250 has a greater area in the horizontal plane than the second flow rate restrictor 252 and the second flow rate restrictor 252 has a greater area in the horizontal plane than the third flow rate restrictor 254, etc. Fluid is now flowing and the flow rate is proportional to the interstitial opening created between the outer edge of the first flow rate restrictor 250 and the inner perimeter of the stationary riser 42 and the height of the fluid level over the interstitial opening 102.

Figure 19:
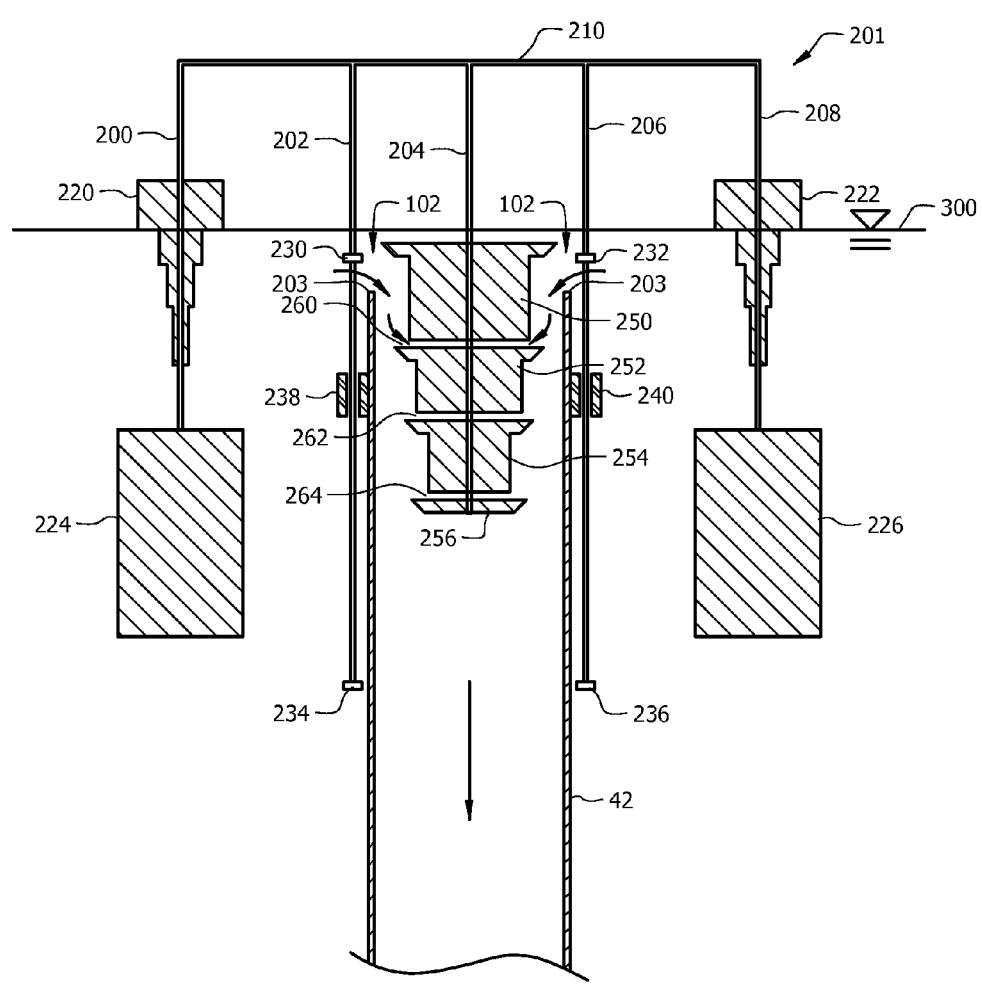
FIG. 19 illustrates a perspective view of a stepped embodiment of the multi-rate flow control system showing operation at a third stage of flow.
Figure 20:
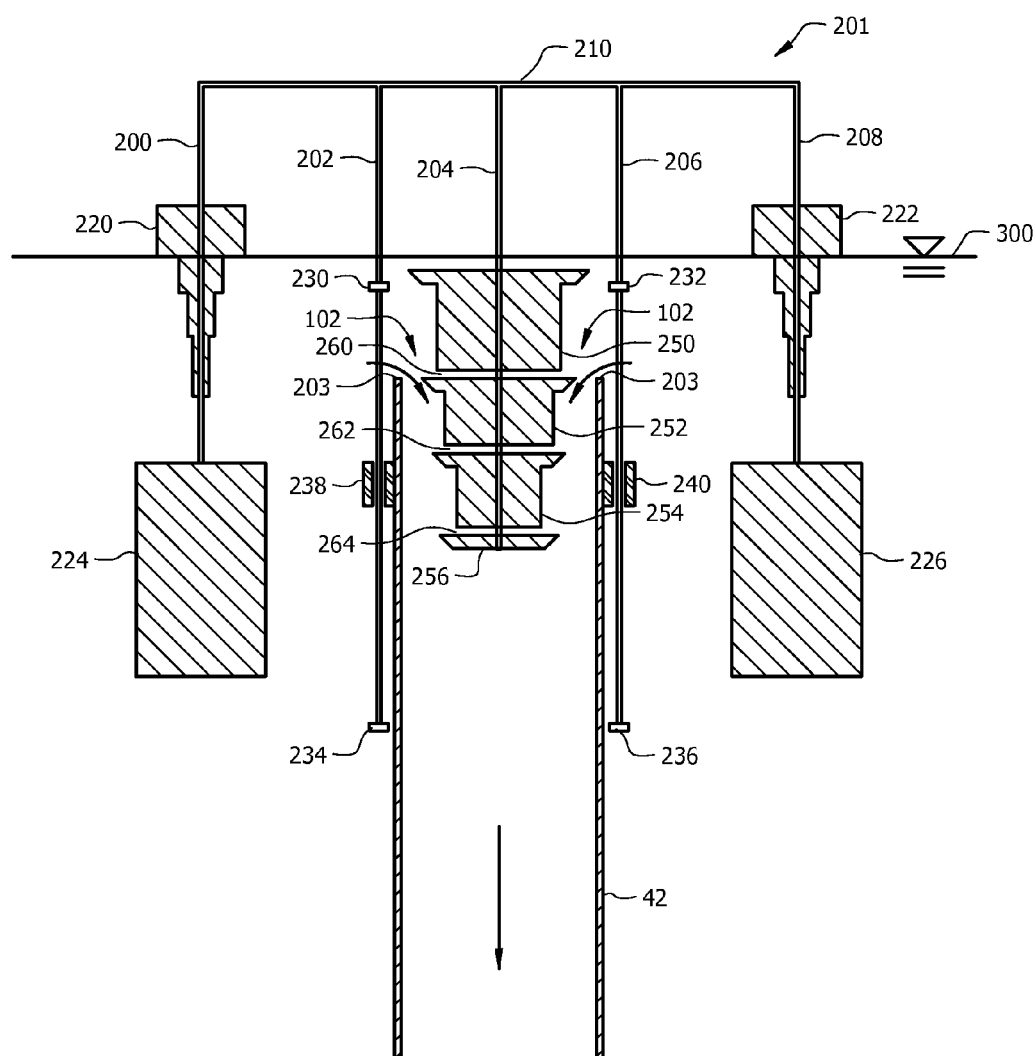
FIG. 20 illustrates a perspective view of a stepped embodiment of the multi-rate flow control system showing operation at a fourth stage of flow.

Once the outer edge of the first flow rate restrictor 250 rises above the upper rim 203 of the stationary riser 42 as shown in FIG. 19, fluid flows around the first flow rate restrictor 250 and fills the optional space 260 between the first flow rate restrictor 250 and the second flow rate restrictor 252 causing the first flow rate restrictor 250 to become buoyant. As the first flow rate restrictor 250 becomes buoyant, the moveable riser 250/252/254/256 rises until the cross sectional area of the floats 220/222 changes and compensates for the increased total buoyancy resulting from the first flow rate restrictor 250 becoming buoyant. The distance which the moveable riser 250/252/254/256 rises is at least enough such that the second flow rate restrictor 252 becomes the active flow rate restrictor and the flow rate of the fluid 300 is regulated by and proportional to the depth of the fluid over the interstitial opening 102 created by the outer edge of the second (and now active) flow rate restrictor 252 and the inner perimeter of the stationary riser 42. This flow rate remains constant until the active, second flow rate restrictor 252 rises to the upper rim 203 of the stationary riser 42 as shown in FIG. 20.

Figure 21:
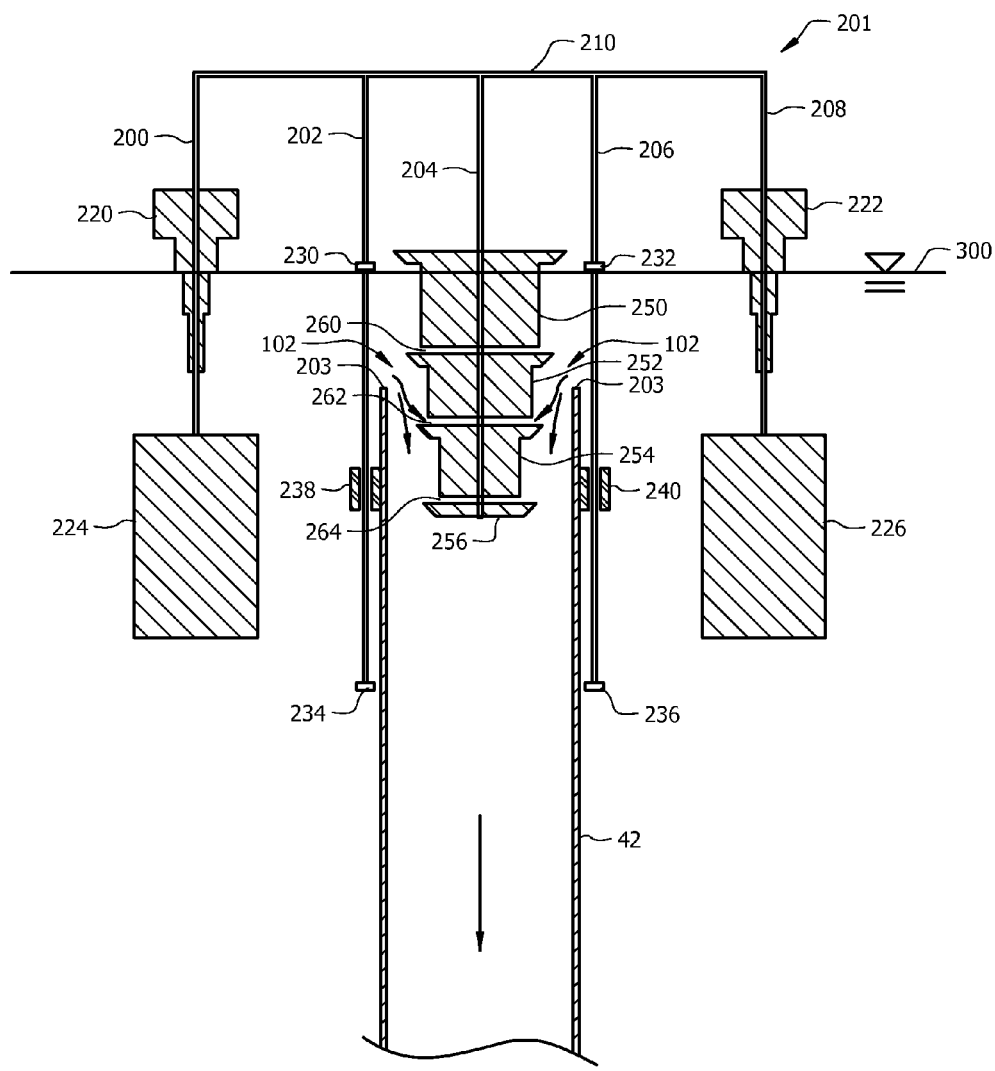
FIG. 21 illustrates a perspective view of a stepped embodiment of the multi-rate flow control system showing operation at a fifth stage of flow.
Figure 22:
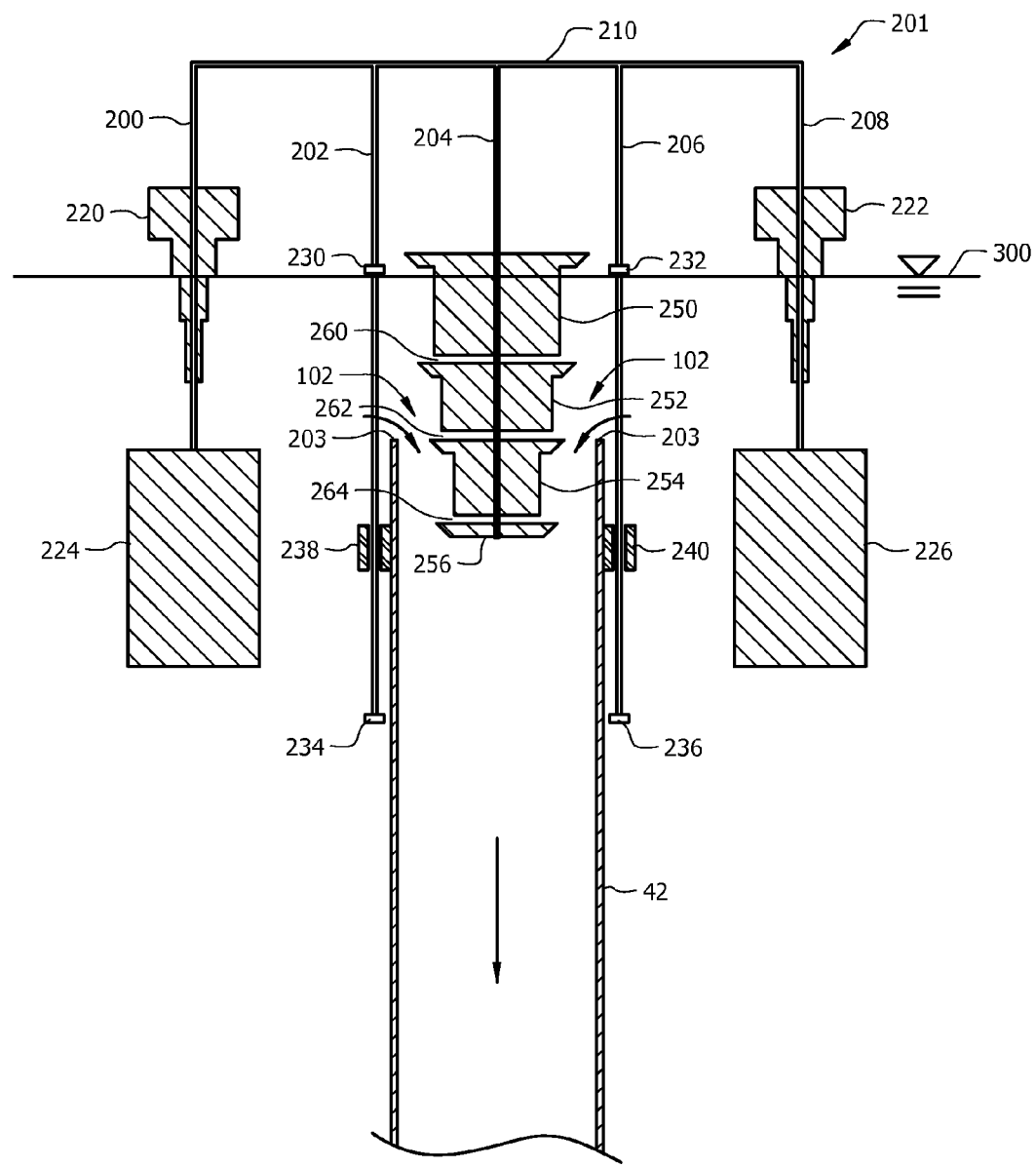
FIG. 22 illustrates a cross-sectional view of a stepped embodiment of the multi-rate flow control system showing operation at a sixth stage of flow.
Figure 23:
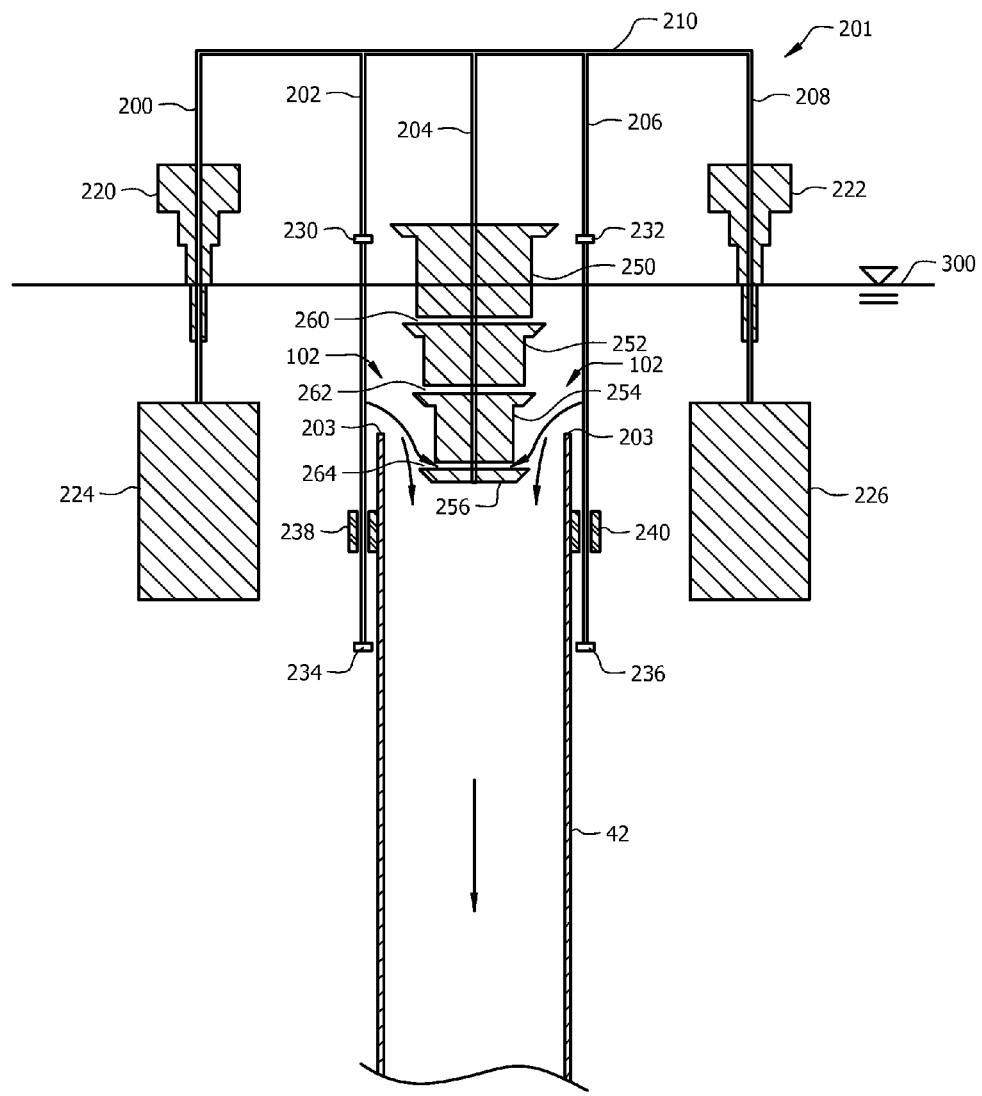
FIG. 23 illustrates a cross-sectional view of a stepped embodiment of the multi-rate flow control system showing operation at a seventh stage of flow.
Figure 24:
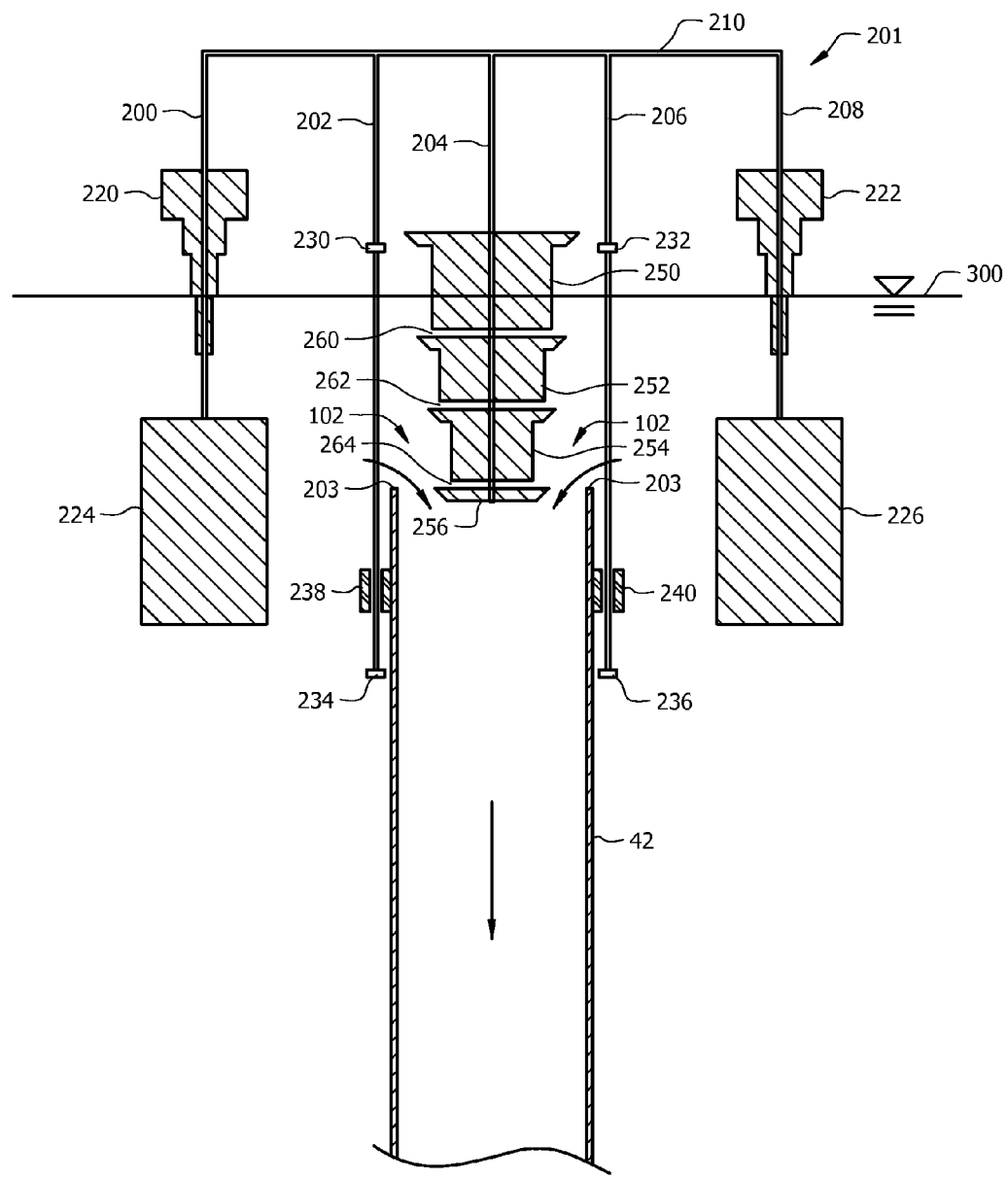
FIG. 24 illustrates a cross-sectional view of a stepped embodiment of the multi-rate flow control system showing operation at an eighth stage of flow.
Figure 24A:
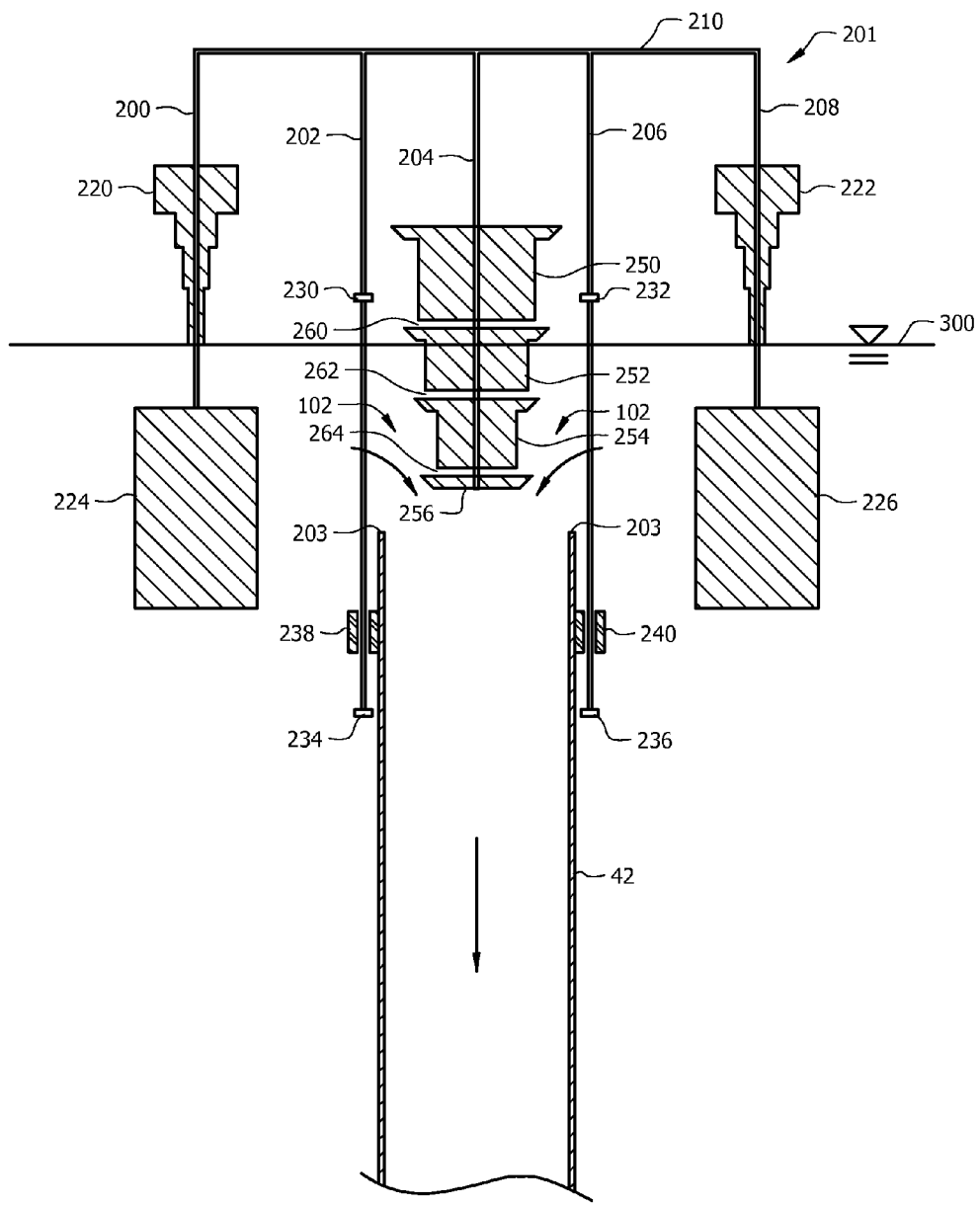
FIG. 24A illustrates a cross-sectional view of a stepped embodiment of the multi-rate flow control system showing operation at a ninth stage of flow.

Once the outer edge of the second flow rate restrictor 252 rises above the upper rim 203 of the stationary riser 42 as shown in FIG. 21, fluid flows around the second flow rate restrictor 252 and fills the optional space 262 between the second flow rate restrictor 252 and the third flow rate restrictor 254 causing the second flow rate restrictor 252 to become buoyant. As the second flow rate restrictor 252 becomes buoyant, the moveable riser 250/252/254/256 rises until the cross sectional area of the floats 220/222 changes and compensates for the increased total buoyancy resulting from the second flow rate restrictor 252 becoming buoyant. The distance which the moveable riser 250/252/254/256 rises is at least enough such that the third flow rate restrictor 254 becomes the active flow rate restrictor and the flow rate of the fluid 300 is regulated by and proportional to the depth of the fluid over the interstitial opening 102 created by the outer edge of the third (and now active) flow rate restrictor 254 and the inner perimeter of the stationary riser 42. This flow rate remains constant until the active, third flow rate restrictor 254 rises to the upper rim 203 of the stationary riser 42 as shown in FIG. 22. Once the upper edge of the third flow rate restrictor 254 rises above the upper rim 203 of the stationary riser 42 as shown in FIG. 23, fluid flows around the third flow rate restrictor 254 and fills the optional space 264 between the third flow rate restrictor 254 and the fourth flow rate restrictor 256 causing the third flow rate restrictor 254 to become buoyant. As the third flow rate restrictor 254 becomes buoyant, the moveable riser 250/252/254/256 rises until the cross sectional area of the floats 220/222 changes and compensates for the increased total buoyancy resulting from the third flow rate restrictor 254 becoming buoyant. The distance which the moveable riser 250/252/254/256 rises is at least enough such that the fourth flow rate restrictor 256 becomes the active flow rate restrictor and the flow rate of the fluid 300 is regulated by and proportional to the depth of the fluid over the interstitial opening 102 created by the outer edge of the fourth (and now active) flow rate restrictor 256 and the inner perimeter of the stationary riser 42. This flow rate remains constant until the active, fourth flow rate restrictor 256 rises to the upper rim 203 of the stationary riser 42 as shown in FIG. 24. Once the upper edge of the fourth flow rate restrictor 256 rises above the upper rim 203 of the stationary riser 42 as shown in FIG. 24A, fluid flows around the fourth flow rate restrictor 256 causing the fourth flow rate restrictor 256 to become buoyant. As the fourth flow rate restrictor 256 becomes buoyant, the moveable riser 250/252/254/256 rises until the cross sectional area of the floats 220/222 changes and compensates for the increased total buoyancy resulting from the fourth flow rate restrictor 256 becoming buoyant. The distance which the moveable riser 250/252/254/256 rises is at least enough such that the upper rim 203 of the stationary riser 42 is unobstructed and flow rate is proportional to the depth of the fluid 300 over the upper rim 203 of the stationary riser 42 and the cross sectional area of the inner perimeter of the upper rim 203 of the stationary riser 42. Since the upper rim 203 of the stationary riser 42 is fixed, the flow rate continuously increases with increasing depths of fluid 300. As the fluid level 300 continues to rise, the flow rate restrictors 250/252/ 254/256 are prevented from floating beyond a maximum design level by the high-level stops 234/236 being impeded by the bushings 238/240.

As discussed prior, any number of flow rate restrictors 250/252/254/256 are anticipated.

Figure 25:
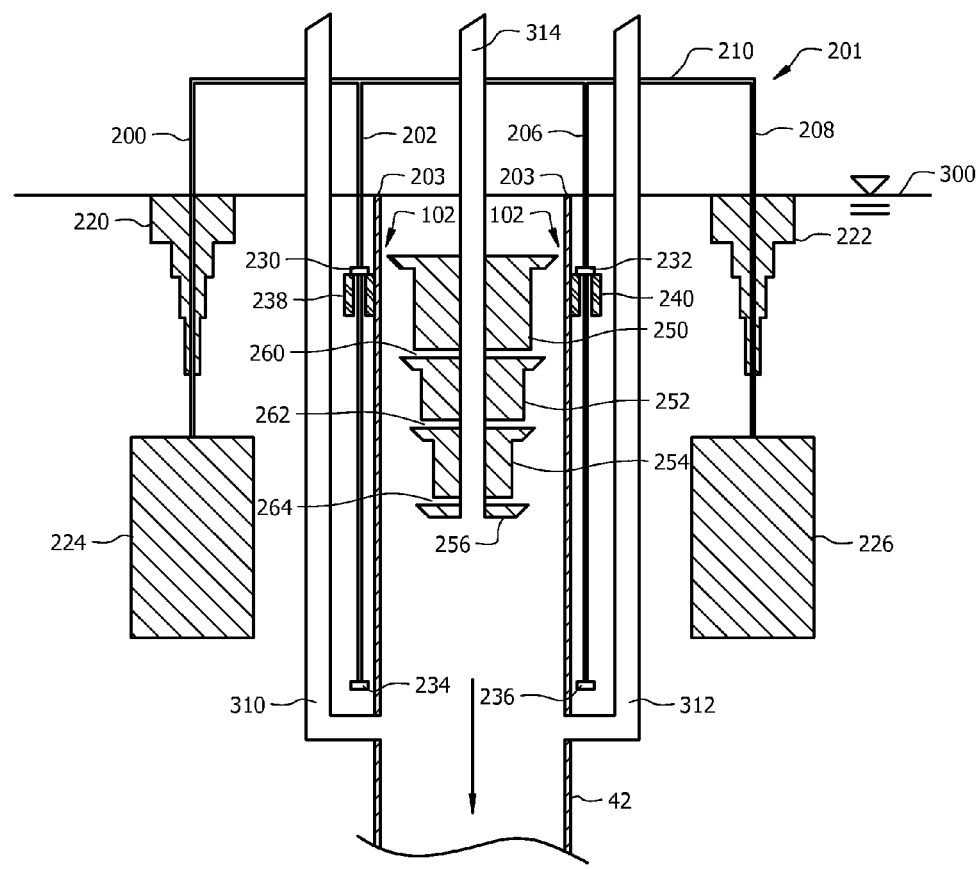
FIG. 25 illustrates a cross-sectional view of an embodiment of the multi-rate flow control system showing several venting techniques.

Referring to FIG. 25, a cross-sectional view of the multi-rate flow control system 201 will be described. As fluid flows out of the drainage system 24, a vacuum is created within the stationary riser 42. In order to prevent a siphon from forming which would prevent the multi-rate flow control system 201 from maintaining constant discharge rates as intended, one or more vent tubes 310/312/314 connect the interior of the stationary riser 42 with outside, ambient air-pressure.

Again, although not required, it is preferred that the floats 220/222/224/226 are in the form of rings to assist in skimming debris from the fluid 300 and to provide better stability. Therefore, even though shown with different floats on each side 220/222, it is anticipated that this is one contiguous float 220. In some embodiments, skimming debris form the surface of the fluid 300 is accomplished by surrounding the floats 220/222/224/226 with an optional continuous baffle (not shown). Although not required, in the preferred embodiment, the fluid displacement of the upper floats 220/222 is graduated to provide different levels of buoyancy depending upon how much of the volume of the upper floats 220/222 are lifted out of the fluid 300.

Equivalent elements can be substituted for the ones set forth above such that they perform in substantially the same manner in substantially the same way for achieving substantially the same result.

It is believed that the system and method of the present invention and many of its attendant advantages will be understood by the foregoing description. It is also believed that it will be apparent that various changes may be made in the form, construction and arrangement of the components thereof without departing from the scope and spirit of the invention or without sacrificing all of its material advantages. The form herein before described being merely exemplary and explanatory embodiment thereof. It is the intention of the following claims to encompass and include such changes.

What is claimed is:

1. A flow control system for integration into a detention pond and/or surge tank, the flow control system comprising:
   a stationary riser, the stationary riser having a stationary riser hollow core, an axis of the stationary riser hollow core being substantially vertical, an upper end of the stationary riser having an upper edge and a lower end of the stationary riser hollow core fluidly connected to a drainage system;
   a movable riser, the movable riser suspended within the stationary riser and movable vertically within and above the stationary riser along the axis, the movable riser having a flange, the flange defining a gap between an outer edge of the flange distal from the drainage system and the stationary riser hollow core, the movable riser having a cavity, the cavity open and in fluid communication with the stationary riser hollow core;
   a vent providing fluid communication between an area above a fluid level of the detention pond and the cavity within the movable riser, thereby permitting air to enter the cavity of the movable riser; and
   at least one float interfaced to the movable riser, the at least one float providing buoyancy to the movable riser, raising the movable riser responsive to increases in the fluid level in the detention pond and lowering the movable riser responsive to decreases in the fluid level in the detention pond.

2. The flow control system of claim 1, wherein the fluid flows through the gap between the flange and the stationary riser and then flows out to the drainage system, the flange is held at a constant depth below the fluid level by the at least one float.

3. The flow control system of claim 2, wherein a flow rate is proportional to the constant depth below the fluid level of the flange and an area of the gap.

4. The flow control system of claim 1, further comprising an orifice in an end of the movable riser, the orifice in fluid communications with the cavity and the orifice suspended at an orifice depth below the fluid level.

5. The flow control system of claim 4, wherein the fluid flows through the gap between the flange and the stationary riser and then flows out to the drainage system, the flange is held at a constant depth below the fluid level by the at least one float and wherein the fluid flows into the orifice, through the cavity and then flows out to the drainage system, the orifice suspended at an orifice constant depth below the fluid level by the at least one float.

6. The flow control system of claim 5, wherein a flow rate is proportional to the constant depth below the fluid level of the flange and an area of the gap, and to the orifice constant depth below the fluid level and an area of the orifice.

7. The flow control system of claim 1, wherein the at least one float comprises a continuous float, the continuous float entirely surrounding the upper edge of the stationary riser, thereby the continuous float further reduces debris from entering the stationary riser.

8. A flow control system for integration into a detention pond and/or surge tank, the flow control system comprising:
- a stationary riser, the stationary riser having a stationary riser hollow core, an axis of the stationary riser hollow core being substantially vertical, an upper end of the stationary riser having an upper edge and a lower end of the stationary riser hollow core fluidly connected to a drainage system;
- a movable riser, the movable riser suspended within the stationary riser and movable vertically within and above the stationary riser along the axis, the movable riser having a flange, the flange defining a gap between an outer edge of the flange distal from the drainage system and the stationary riser hollow core, the movable riser having a cavity, the cavity open and in fluid communication with the stationary riser hollow core, an orifice in an end of the movable riser, the orifice in fluid communications with the cavity and the orifice suspended at an orifice depth below the fluid level;
- a vent providing fluid communication between an area above a fluid level of the detention pond and the cavity within the movable channel, thereby permitting air to enter the cavity of the movable riser; and
- at least one float interfaced to the movable riser, the at least one float providing buoyancy to the movable riser, raising the movable riser responsive to increases in the fluid level in the detention pond and lowering the movable riser responsive to decreases in the fluid level in the detention pond.

9. The flow control system of claim 8, wherein the fluid flows through the gap between the flange and the stationary riser and then flows out to the drainage system, the flange is held at a constant depth below the fluid level by the at least one float.

10. The flow control system of claim 9, wherein a flow rate is proportional to the constant depth below the fluid level of the flange and an area of the gap.

11. The flow control system of claim 10, wherein the fluid also flows into the orifice, through the cavity and then flows out to the drainage system, the orifice suspended at an orifice constant depth below the fluid level by the at least one float.

12. The flow control system of claim 11, wherein a flow rate is proportional to the constant depth below the fluid level of the flange and an area of the gap, and to the orifice constant depth below the fluid level and an area of the orifice.

13. The flow control system of claim 8, wherein the at least one float comprises a continuous float, the continuous float entirely surrounding the upper edge of the stationary riser, thereby the continuous float further reduces debris from entering the stationary riser.

14. A flow control system for integration with a detention pond and/or surge tank, the flow control system comprising:
- a stationary riser, the stationary riser having a stationary riser hollow core, an axis of the stationary riser hollow core being substantially vertical, an upper end of the stationary riser having an upper edge and a lower end of the stationary riser hollow core fluidly connected to a drainage system;
- a movable riser, the movable riser moves vertically within and above the stationary riser hollow core along the axis; and
- a buoyant member for moving the movable riser, the buoyant member synchronizes a position of the movable riser to a level of the fluid;
- wherein the fluid flows through a gap between a flange of the movable riser and the stationary riser and then flows out to the drainage system, where in the flange is held at a constant depth below the level of the fluid by the buoyant member; and
- wherein a flow rate is proportional to the constant depth of the flange and an area of the gap.

15. The flow control system of claim 14, wherein the fluid also flows into a orifice in the movable riser, through a cavity within the movable riser and then flows out to the drainage system, the orifice suspended at an orifice constant depth below the level of the fluid by the buoyant member.

16. The flow control system of claim 15, wherein a flow rate is proportional to the constant depth of the flange and an area of the gap, and to the orifice constant depth and an area of the orifice.

17. The flow control system of claim 14, wherein the buoyant member comprises a continuous float, the continuous float entirely surrounding the upper edge of the stationary riser, thereby the continuous float further reduces debris from entering the stationary riser.

* * * * *